US012481467B2

(12) United States Patent
Yasuda et al.

(10) Patent No.: US 12,481,467 B2
(45) Date of Patent: Nov. 25, 2025

(54) INFORMATION PROCESSING APPARATUS, CONTROL METHOD OF INFORMATION PROCESSING APPARATUS, AND NON-TRANSITORY COMPUTER-READABLE STORAGE MEDIUM TO DISPLAY AN OBJECT FOR RECEIVING A PRINT SETTING

(71) Applicant: CANON KABUSHIKI KAISHA, Tokyo (JP)

(72) Inventors: Akihiro Yasuda, Chiba (JP); Kazuyuki Saito, Kanagawa (JP); Kazushige Shimada, Kanagawa (JP); Shinya Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,997

(22) Filed: Apr. 11, 2023

(65) Prior Publication Data
US 2023/0333794 A1   Oct. 19, 2023

(30) Foreign Application Priority Data
Apr. 18, 2022   (JP) .................... 2022-068063

(51) Int. Cl.
*G06F 3/12* (2006.01)
(52) U.S. Cl.
CPC .......... *G06F 3/1264* (2013.01); *G06F 3/1205* (2013.01); *G06F 3/1287* (2013.01)
(58) Field of Classification Search
None
See application file for complete search history.

(56) References Cited

U.S. PATENT DOCUMENTS

| 8,610,927 B2 * | 12/2013 | Sweet | G06F 3/1204 709/224 |
| 2009/0195808 A1 * | 8/2009 | Onsen | G06F 3/1285 358/1.13 |

(Continued)

FOREIGN PATENT DOCUMENTS

| JP | 2010097505 A | * | 4/2010 |
| JP | 2021124791 A | | 8/2021 |

OTHER PUBLICATIONS

Kono, JP-2010097505-A English Translation, p. 8 fifth paragraph (highlighted) (Year: 2010).*

*Primary Examiner* — Miya J Cato
(74) *Attorney, Agent, or Firm* — Canon U.S.A., Inc. IP Division

(57) ABSTRACT

An information processing apparatus storing information regarding a printer and a predetermined printer driver in association includes a controller configured to acquire first capability information defined by a predetermined protocol and second capability information undefined by the predetermined protocol, and store the first capability information and the second capability information having been acquired in association with the information regarding the printer, wherein, based on a storage unit storing the first capability information and the second capability information, a predetermined object is displayed in a selectable state on a display unit, and wherein, based on the displayed predetermined object being selected, an object for receiving a print setting is displayed on the display unit in accordance with the second capability information stored in association with the information regarding the printer.

24 Claims, 18 Drawing Sheets

(56) References Cited

U.S. PATENT DOCUMENTS

2020/0004477 A1\* 1/2020 Morita ................. G06F 3/1232
2020/0409624 A1\* 12/2020 Saigusa ................ G06F 21/608
2021/0055893 A1\* 2/2021 Saigusa ................ G06F 3/1205

\* cited by examiner

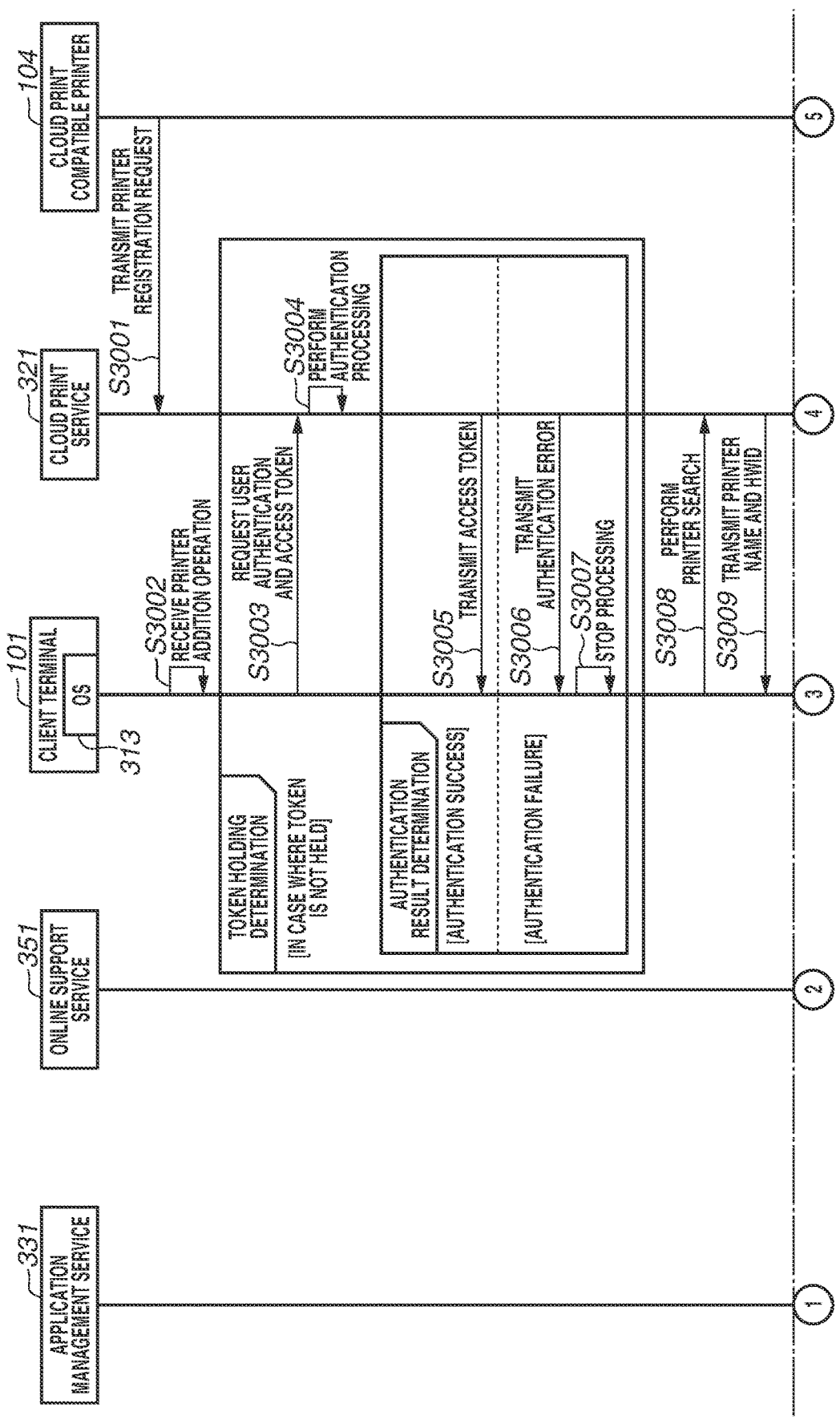

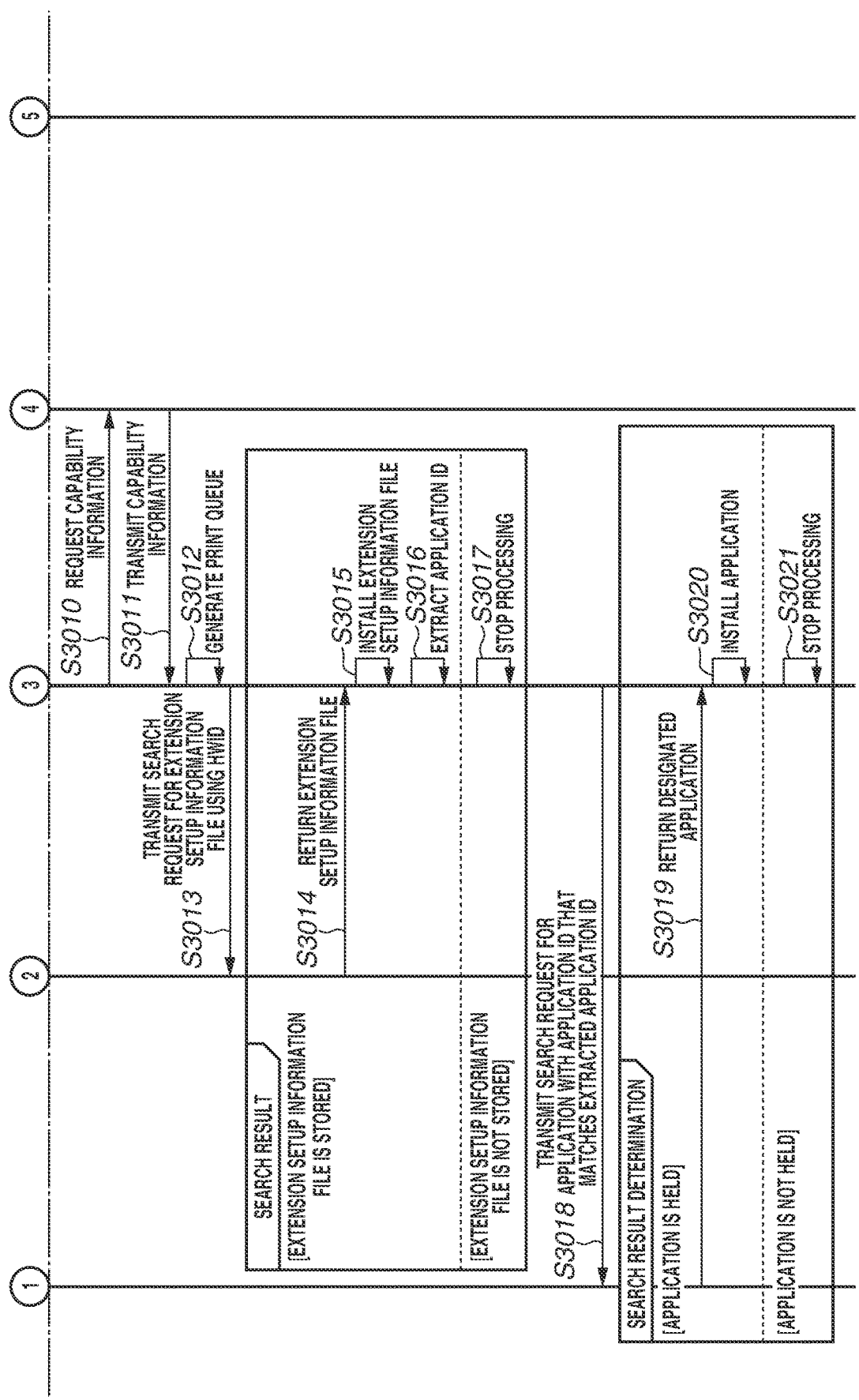

FIG.5

| ITEM NAME | ATTRIBUTE VALUE |
|---|---|
| SHEET SIZE (501) | A6/A5/A4/B5/LETTER/LEGAL/EXECUTIVE/POSTCARD/#10 ENVELOPE PORTRAIT /DL ENVELOPE PORTRAIT/ENVELOPE (Y4) PORTRAIT/ENVELOPE (N3) PORTRAIT /ENVELOPE (N4) PORTRAIT/ENVELOPE C5 PORTRAIT /ENVELOPE MONARCH PORTRAIT/L/4 × 6 (KG SIZE)/5 × 7 /ONE-SIXTH (8 × 10)/SQUARE (127 mm)/NAME CARD (CARD) /ENVELOPE (Y6) PORTRAIT/SQUARE (89 mm)/SQUARE (4 × 4) |
| SHEET TYPE (502) | ENVELOPE/LABEL/PLAIN PAPER/PHOTO PAPER /PHOTO PAPER GLOSSY STANDARD/PHOTO PAPER SILKY TONE /INKJET POSTCARD (COMMUNICATION SIDE) /INKJET POSTCARD (ADDRESS SIDE) /INKJET PHOTO POSTCARD (COMMUNICATION SIDE) /INKJET PHOTO POSTCARD (ADDRESS SIDE) |
| NUMBER OF COPIES (503) | MAX = 99 |
| PAGE ORIENTATION | PORTRAIT/LANDSCAPE |
| PRINTING QUALITY | STANDARD/DRAFT |
| SORTED PRINTING | ON/OFF |
| STAPLING | OFF/AUTOMATIC/TOP LEFT/BOTTOM LEFT/TOP RIGHT/BOTTOM RIGHT/LEFT (DOUBLE) /TOP (DOUBLE)/RIGHT (DOUBLE)/BOTTOM (DOUBLE)/SADDLE STITCH |
| PUNCHING | OFF/HOLE PUNCH (AUTOMATIC)/HOLE PUNCH (LEFT 2 HOLES) /HOLE PUNCH (LEFT 3 HOLES)/HOLE PUNCH (LEFT 4 HOLES) /HOLE PUNCH (LEFT MULTIPLE HOLES)/HOLE PUNCH (RIGHT 2 HOLES) /HOLE PUNCH (RIGHT 3 HOLES)/HOLE PUNCH (RIGHT 4 HOLES) /HOLE PUNCH (RIGHT MULTIPLE HOLES)/HOLE PUNCH (TOP 2 HOLES) /HOLE PUNCH (TOP 3 HOLES)/HOLE PUNCH (TOP 4 HOLES) /HOLE PUNCH (TOP MULTIPLE HOLES)/HOLE PUNCH (BOTTOM 2 HOLES) /HOLE PUNCH (BOTTOM 3 HOLES)/HOLE PUNCH (BOTTOM 4 HOLES) /HOLE PUNCH (BOTTOM MULTIPLE HOLES) |
| FOLDING SETTING | OFF/HALF FOLD/C-FOLD/QUARTO FOLD/TRI-FOLD/Z-FOLD /SADDLE STITCH FOLD (OUTPUT FROM SADDLE STITCH FINISHER) |
| COLOR MODE (504) | COLOR/MONOCHROME |
| N-ON-1 PRINTING | OFF/2IN1/4IN1/6IN1/9IN1/16IN1 |
| ARRANGEMENT ORDER | LEFT TO RIGHT/RIGHT TO LEFT |
| SCALING | OFF/MATCH PAGE WIDTH SIZE/MATCH SCREEN SIZE |
| TWO-SIDED PRINTING | 1-SIDED/2-SIDED |
| BINDING DIRECTION | LONG EDGE BINDING/SHORT EDGE BINDING |
| 180-DEGREE ROTATION | OFF/LEFT ROTATION/RIGHT ROTATION |
| STORE JOB IN PRINTER | ON/OFF |
| JOB NAME ABBREVIATION | ON/OFF |
| STAPLELESS BINDING | ON/OFF |

FIG.6A

```xml
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

<psk:JobCopiesAllDocuments psf2:psftype="ParameterDef">
    <psf:DataType xsi:type="xsd:QName" psf2:psftype="Property">xsd:integer</psf:DataType>
    <psf:DefaultValue xsi:type="xsd:integer" psf2:psftype="Property">1</psf:DefaultValue>
    <psf:Mandatory xsi:type="xsd:QName" psf2:psftype="Property">psk:Unconditional</psf:Mandatory>
    <psf:MaxValue xsi:type="xsd:integer" psf2:psftype="Property">999</psf:MaxValue>
    <psf:MinValue xsi:type="xsd:integer" psf2:psftype="Property">1</psf:MinValue>
    <psf:Multiple xsi:type="xsd:integer" psf2:psftype="Property">1</psf:Multiple>
    <psf:UnitType xsi:type="xsd:string" psf2:psftype="Property">copies</psf:UnitType>
  </psk:JobCopiesAllDocuments>

<psk:PageMediaSize psf2:psftype="Feature">
    <psk:ISOA4 psf2:psftype="Option">
      <psk12:PortraitImageableSize xsi:type="psf2:ImageableAreaType" psf2:psftype="Property">12700,12700,184600,271600</psk12:PortraitImageableSize>
      <psk:MediaSizeHeight xsi:type="xsd:integer" psf2:psftype="ScoredProperty">297000</psk:MediaSizeHeight>
      <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option" psf2:default="true">
      <psk12:PortraitImageableSize xsi:type="psf2:ImageableAreaType" psf2:psftype="Property">12700,12700,190500,254000</psk12:PortraitImageableSize>
      <psk:MediaSizeHeight xsi:type="xsd:integer" psf2:psftype="ScoredProperty">279400</psk:MediaSizeHeight>
      <psk:MediaSizeWidth xsi:type="xsd:integer" psf2:psftype="ScoredProperty">215900</psk:MediaSizeWidth>
    </psk:NorthAmericaLetter>
  </psk:PageMediaSize>

<psk:PageOrientation psf2:psftype="Feature">
    <psk:Landscape psf2:psftype="Option"/>
    <psk:Portrait psf2:psftype="Option" psf2:default="true"/>
  </psk:PageOrientation>

...............

<psk:PageOutputColor psf2:psftype="Feature">
    <psk:Color psf2:psftype="Option" psf2:default="true">
      <psk:DeviceBitsPerPixel xsi:type="xsd:integer" psf2:psftype="ScoredProperty">24</psk:DeviceBitsPerPixel>
      <psk:DriverBitsPerPixel xsi:type="xsd:integer" psf2:psftype="ScoredProperty">24</psk:DriverBitsPerPixel>
    </psk:Color>
  </psk:PageOutputColor>
</PrintDeviceCapabilities>
```

FIG.6B-1

```xml
<?xml version="1.0" encoding="UTF-8"?>
<PrintDeviceCapabilities
    xmlns:ns0000="http://schemas.microsoft.com/windows/2018/04/printing/printschemakeywords/ipp"
    xmlns:xsi="http://www.w3.org/2001/XMLSchema-instance"
    xmlns:xsd="http://www.w3.org/2001/XMLSchema"
    xmlns:xml="http://www.w3.org/XML/1998/namespace"
    xmlns:psk="http://schemas.microsoft.com/windows/2003/08/printing/printschemakeywords"
    xmlns:psk11="http://schemas.microsoft.com/windows/2013/05/printing/printschemakeywordsv11"
    xmlns:psk12="http://schemas.microsoft.com/windows/2013/12/printing/printschemakeywordsv12"
    xmlns:psf="http://schemas.microsoft.com/windows/2003/08/printing/printschemaframework"
    xmlns:psf2="http://schemas.microsoft.com/windows/2013/12/printing/printschemaframework2"
    xmlns="http://schemas.microsoft.com/windows/2013/12/printing/printschemaframework2"
    version="2">

<!-- copies-default, copies-supported -->
  <psk:JobCopiesAllDocuments psf2:psftype="ParameterDef">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>

<!-- media-default, media-supported, media-col-database -->
  <psk:PageMediaSize psf2:psftype="Feature">
    <psk:JapanHagakiPostcard psf2:psftype="Option" psf2:default="false">
      <psk:MediaSizeWidth xsi:type="xsd:integer" psf2:psftype="ScoredProperty">100000</psk:MediaSizeWidth>
      <psk:MediaSizeHeight xsi:type="xsd:integer" psf2:psftype="ScoredProperty">148000</psk:MediaSizeHeight>
      <psk12:PortraitImageableSize xsi:type="psf2:ImageableAreaType" psf2:psftype="Property">3400,5000,93200,138000</psk12:PortraitImageableSize>
      <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
      <psk:MediaSizeWidth xsi:type="xsd:integer" psf2:psftype="ScoredProperty">148000</psk:MediaSizeWidth>
      <psk:MediaSizeHeight xsi:type="xsd:integer" psf2:psftype="ScoredProperty">210000</psk:MediaSizeHeight>
      <psk12:PortraitImageableSize xsi:type="psf2:ImageableAreaType" psf2:psftype="Property">3400,5000,141200,200000</psk12:PortraitImageableSize>
      <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
      <psk:MediaSizeWidth xsi:type="xsd:integer" psf2:psftype="ScoredProperty">210000</psk:MediaSizeWidth>
      <psk:MediaSizeHeight xsi:type="xsd:integer" psf2:psftype="ScoredProperty">297000</psk:MediaSizeHeight>
      <psk12:PortraitImageableSize xsi:type="psf2:ImageableAreaType" psf2:psftype="Property">3400,5000,203200,287000</psk12:PortraitImageableSize>
      <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">279400</psk:MediaSizeHeight>
      <psk12:PortraitImageableSize xsi:type="psf2:ImageableAreaType" psf2:psftype="Property">6400,5000,203200,269400</psk12:PortraitImageableSize>
      <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
      <psk:MediaSizeWidth xsi:type="xsd:integer" psf2:psftype="ScoredProperty">105000</psk:MediaSizeWidth>
```

FIG.6B-2

```xml
    <psk:MediaSizeHeight xsi:type="xsd:integer" psf2:psftype="ScoredProperty">235000</psk:MediaSizeHeight>
    <psk12:PortraitImageableSize xsi:type="psf2:ImageableAreaType" psf2:psftype="Property">5600,8000,93800,214300</psk12:PortraitImageableSize>
    <psk12:BorderlessImageableSize xsi:type="psf2:ImageableAreaType" psf2:psftype="Property">0,0,105000,235000</psk12:BorderlessImageableSize>
  </psk:JapanYou4Envelope>
  <psk:NorthAmericaLegal psf2:psftype="Option" psf2:default="false">
    <psk:MediaSizeWidth xsi:type="xsd:integer" psf2:psftype="ScoredProperty">215900</psk:MediaSizeWidth>
    <psk:MediaSizeHeight xsi:type="xsd:integer" psf2:psftype="ScoredProperty">355600</psk:MediaSizeHeight>
    <psk12:PortraitImageableSize xsi:type="psf2:ImageableAreaType" psf2:psftype="Property">6400,5000,203200,345600</psk12:PortraitImageableSize>
    <psk12:BorderlessImageableSize xsi:type="psf2:ImageableAreaType" psf2:psftype="Property">0,0,215900,355600</psk12:BorderlessImageableSize>
  </psk:NorthAmericaLegal>
  <psk:JISB5 psf2:psftype="Option" psf2:default="false">
    <psk:MediaSizeWidth xsi:type="xsd:integer" psf2:psftype="ScoredProperty">182000</psk:MediaSizeWidth>
    <psk:MediaSizeHeight xsi:type="xsd:integer" psf2:psftype="ScoredProperty">257000</psk:MediaSizeHeight>
    <psk12:PortraitImageableSize xsi:type="psf2:ImageableAreaType" psf2:psftype="Property">3400,5000,175200,247000</psk12:PortraitImageableSize>
    <psk12:BorderlessImageableSize xsi:type="psf2:ImageableAreaType" psf2:psftype="Property">0,0,182000,257000</psk12:BorderlessImageableSize>
  </psk:JISB5>
</psk:PageMediaSize>

<!-- orientation-requested-default -->
<psk:PageOrientation psf2:psftype="Feature">
  <psk:Portrait psf2:psftype="Option" psf2:default="true"/>
  <psk:Landscape psf2:psftype="Option" psf2:default="false"/>
  <psk:ReverseLandscape psf2:psftype="Option" psf2:default="false"/>
</psk:PageOrientation>

................

<!-- finishings-default, finishings-supported -->
<psk:JobStapleAllDocuments psf2:psftype="Feature">
  <psk:None psf2:psftype="Option" psf2:default="true"/>
  <psk:StapleTopLeft psf2:psftype="Option" psf2:default="false"/>
  <psk:StapleTopRight psf2:psftype="Option" psf2:default="false"/>
  <psk:StapleBottomLeft psf2:psftype="Option" psf2:default="false"/>
  <psk:StapleBottomRight psf2:psftype="Option" psf2:default="false"/>
  <psk:StapleDualLeft psf2:psftype="Option" psf2:default="false"/>
  <psk:StapleDualTop psf2:psftype="Option" psf2:default="false"/>
  <psk:StapleDualRight psf2:psftype="Option" psf2:default="false"/>
  <psk:StapleDualBottom psf2:psftype="Option" psf2:default="false"/>
  <psk:SaddleStitch psf2:psftype="Option" psf2:default="false"/>
</psk:JobStapleAllDocuments>

<!-- sides-default, sides-supported -->
<psk:JobDuplexAllDocumentsContiguously psf2:psftype="Feature">
  <psk:OneSided psf2:psftype="Option" psf2:default="true"/>
  <psk:TwoSidedShortEdge psf2:psftype="Option" psf2:default="false"/>
  <psk:TwoSidedLongEdge psf2:psftype="Option" psf2:default="false"/>
</psk:JobDuplexAllDocumentsContiguously>

<!-- print-color-mode-default, print-color-mode-supported, pwg-raster-document-type-supported -->
<psk:PageOutputColor psf2:psftype="Feature">
  <psk:Color psf2:psftype="Option" psf2:default="true"/>
  <psk:Grayscale psf2:psftype="Option" psf2:default="false"/>
  <psk:Monochrome psf2:psftype="Option" psf2:default="false"/>
</psk:PageOutputColor>
</PrintDeviceCapabilities>
```

FIG.7

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
```

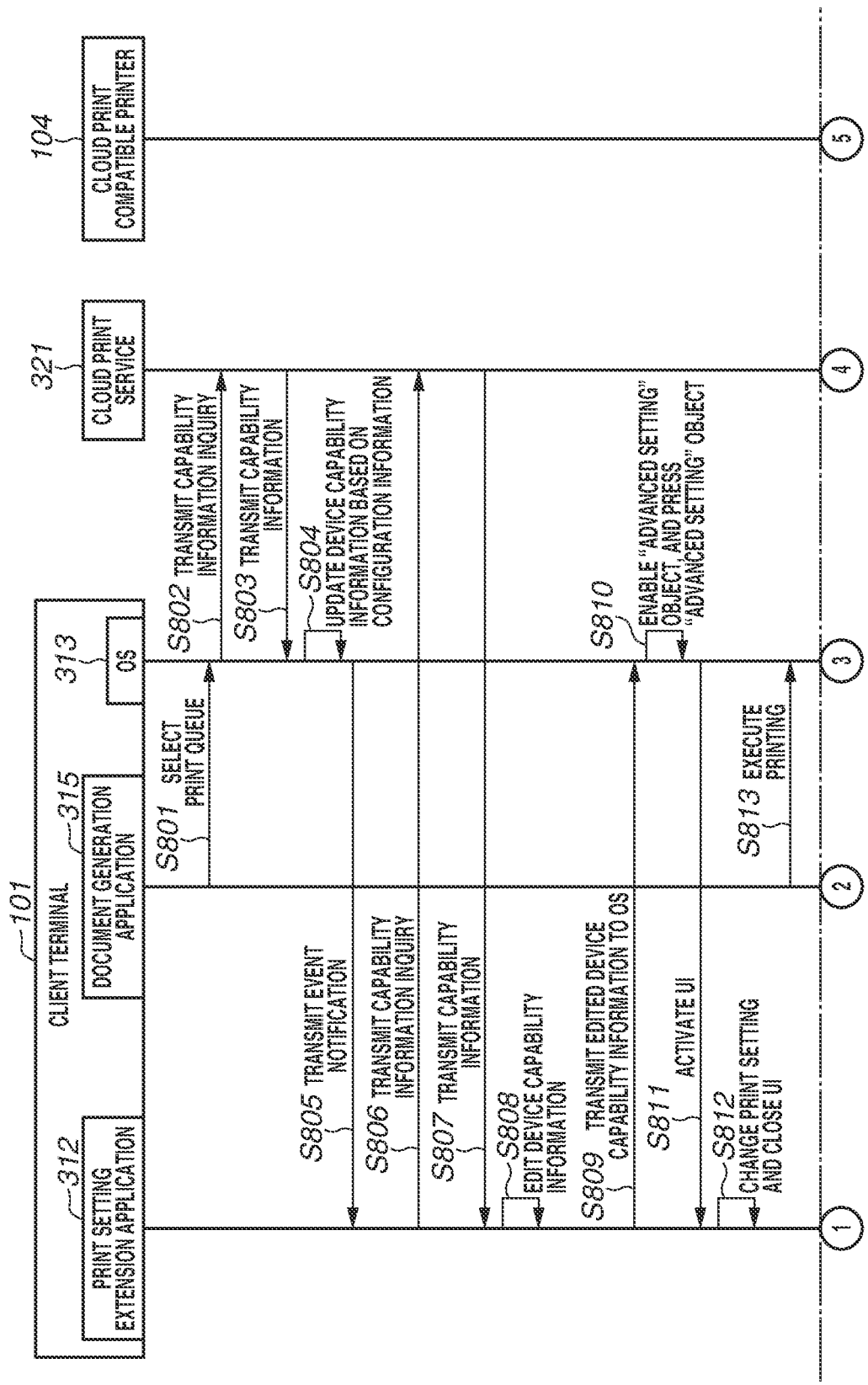

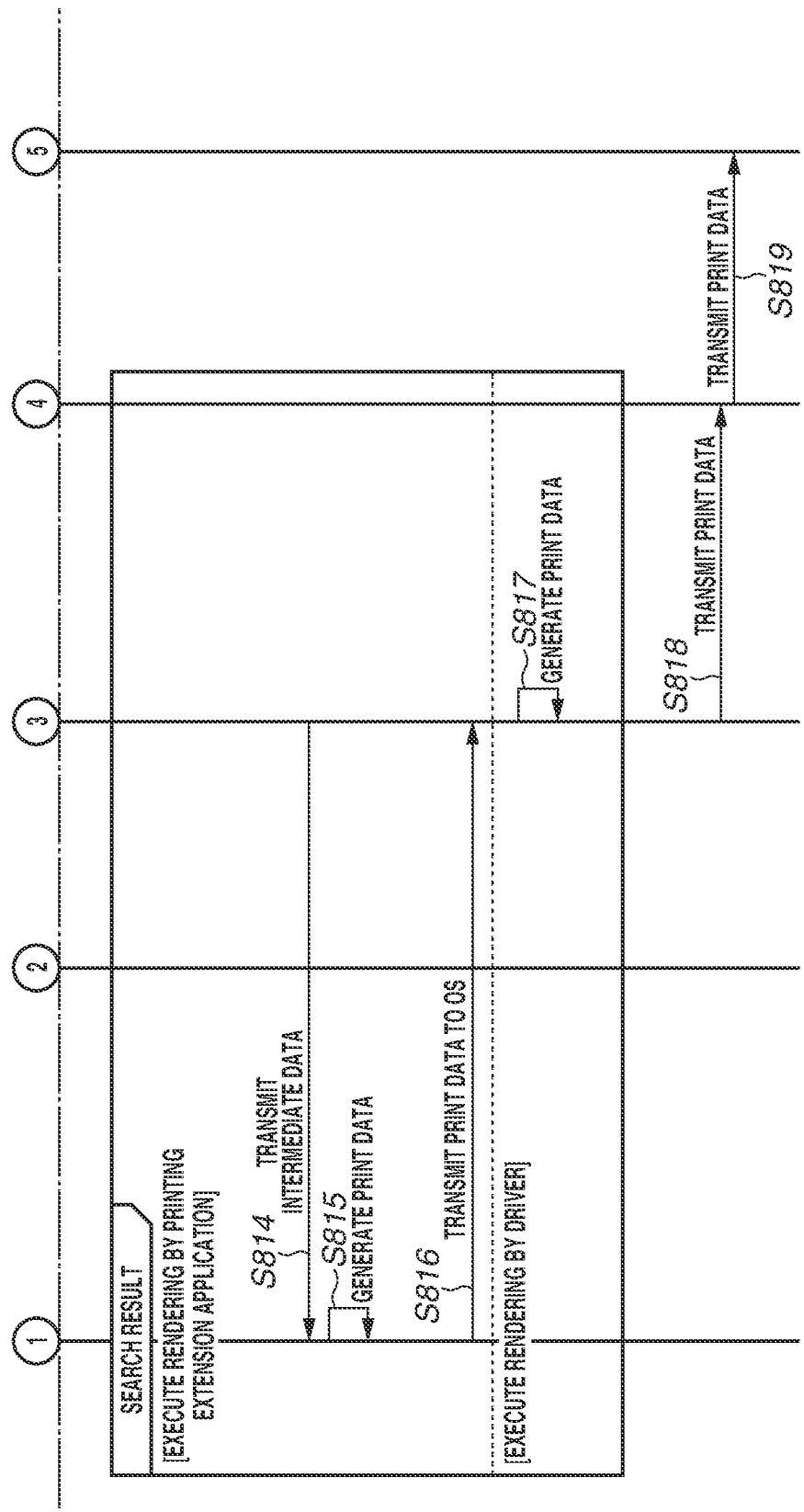

FIG.9A

PRINTING ORIENTATION
[PORTRAIT ▼]

TWO-SIDED PRINTING
[OFF ▼]

ORDER OF PAGES
[FORWARD ▼]

PRINTING QUALITY
[STANDARD ▼]

*901*
[ADVANCED SETTING]

[OK] [CANCEL] [APPLY]
*905* *904* *903*

FIG.9B

SHEET SIZE
[A4 ▼]

NUMBER OF COPIES
[1]

COLOR PRINTING MODE
[COLOR ▼]

SHEET TYPE
[STANDARD ▼]

[OK] [CANCEL]
*902*

FIG.9C

BORDERLESS PRINTING
[OFF ▼]

RESOLUTION
[300 dpi ▼]

SCALING
[OFF ▼]

STAPLING
[OFF ▼]

[OK] [CANCEL]

FIG.9D

FOLDING SETTING
[OFF ▼]

PUNCHING
[OFF ▼]

DISCHARGE PORT
[AUTOMATIC ▼]

NUP
[2 ▼]

[OK] [CANCEL]

FIG.10A

OUTPUT SHEET SIZE — 1001
A4
SHEET TYPE
PLAIN PAPER
NUMBER OF COPIES
1
PAGE ORIENTATION
● PORTRAIT  ○ LANDSCAPE
PRINTING QUALITY
STANDARD

1002 — OK  CANCEL

FIG.10B

SORTED PRINTING
OFF
STAPLING
TOP LEFT
PUNCHING
OFF
FOLDING SETTING
OFF
COLOR MODE
COLOR

OK  CANCEL

FIG.10C

N-ON-1 PRINTING
2IN1
ARRANGEMENT ORDER
LEFT TO RIGHT
SCALING
OFF
TWO-SIDED PRINTING
1-SIDED
BINDING DIRECTION
LONG EDGE BINDING

OK  CANCEL

FIG.10D

180-DEGREE ROTATION
OFF
STORE JOB IN PRINTER
OFF
JOB NAME ABBREVIATION
OFF

OK  CANCEL

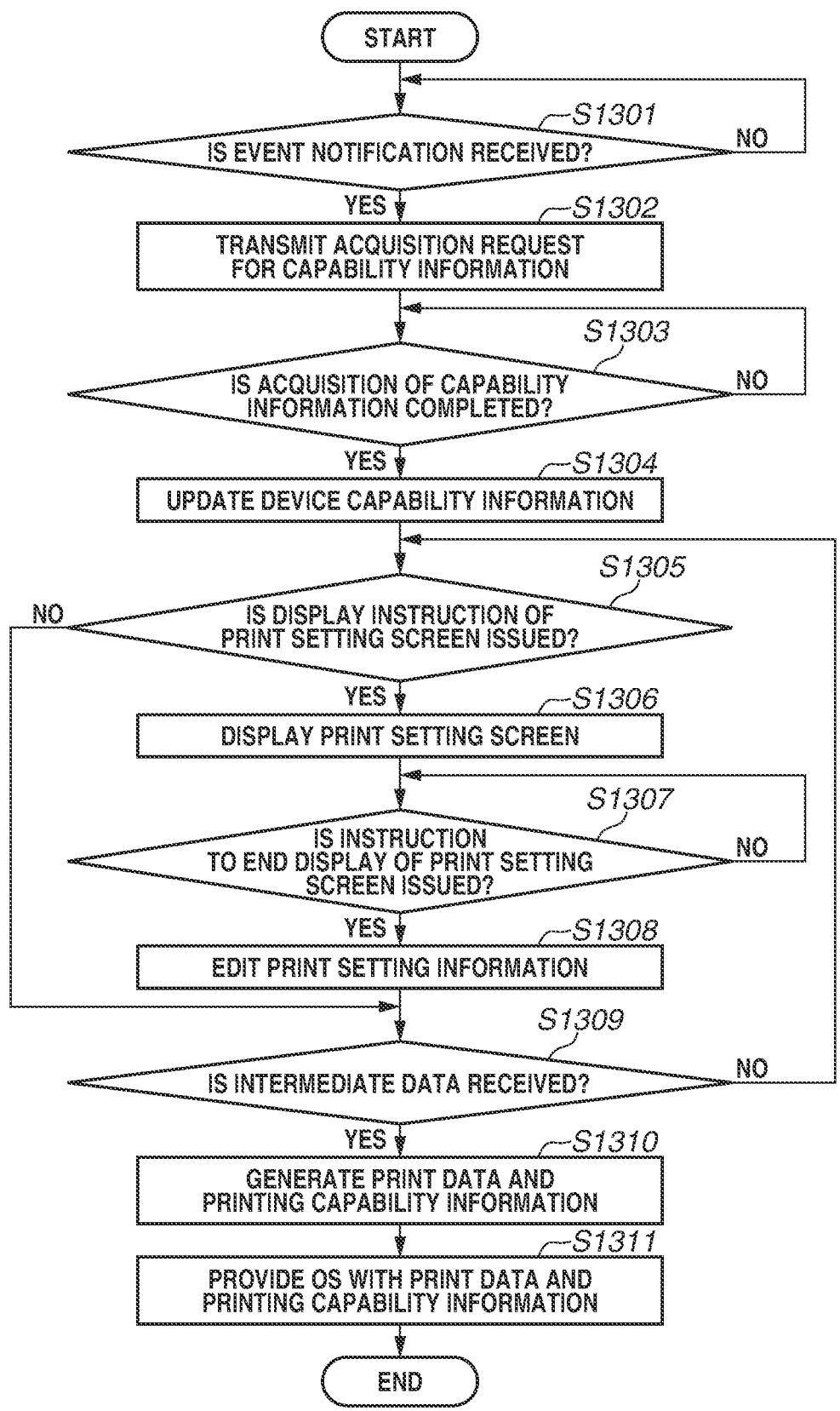

INFORMATION PROCESSING APPARATUS, CONTROL METHOD OF INFORMATION PROCESSING APPARATUS, AND NON-TRANSITORY COMPUTER-READABLE STORAGE MEDIUM TO DISPLAY AN OBJECT FOR RECEIVING A PRINT SETTING

BACKGROUND

Field of the Disclosure

The present disclosure relates to an information processing apparatus, a control method of an information processing apparatus, and a non-transitory computer-readable storage medium.

Description of the Related Art

In recent years, a general-purpose printer driver that uses an industry standard protocol such as the Internet Printing Protocol (IPP) has been considered. Examples of the general-purpose printer driver include a local printer driver that directly connects with a printer, and a cloud printer driver that transmits print data to a cloud print service.

The general-purpose printer driver can communicate with printers provided from a plurality of printer vendors. Thus, by using the general-purpose printer driver, a user can transmit print data to an image formation apparatus and a cloud print service without installing a printer driver unique to a vendor.

Because the above-described general-purpose printer driver handles print jobs to be printed by printers provided from various vendors, items and functions that can be set as print settings are restricted. For this reason, Japanese Patent Application Laid-Open No. 2021-124791 discusses a technique of extending a print queue associated with a printer driver using identification information of a printer associated with the printer driver. With this configuration, a print setting user interface (UI) and a print job edit function that are unique to a vendor can be implemented.

SUMMARY

In a case where a print queue associated with a general-purpose printer driver is extended, if a predetermined object on a print setting screen displayed by an application is selected, a print setting screen unique to a vendor is displayed.

Nevertheless, to display a print setting screen unique to a vendor, it is necessary to acquire capability information of a printer with regard to a setting item unique to the vendor. For example, if the above-described object is operated in a state in which the capability information has not been acquired with regard to the setting item unique to the vendor, display unsuitable for the setting item may be performed.

According to embodiments of the present disclosure, an information processing apparatus storing information regarding a printer and a predetermined printer driver in association includes a controller configured to acquire first capability information defined by a predetermined protocol and second capability information undefined by the predetermined protocol, and store the first capability information and the second capability information having been acquired in association with the information regarding the printer, wherein, based on a storage unit storing the first capability information and the second capability information, a predetermined object is displayed in a selectable state on a display unit, and wherein, based on the displayed predetermined object being selected, an object for receiving a print setting is displayed on the display unit in accordance with the second capability information stored in association with the information regarding the printer.

Further features of the present disclosure will become apparent from the following description of exemplary embodiments with reference to the attached drawings.

BRIEF DESCRIPTION OF THE DRAWINGS

FIGS. 3A and 3B are a diagram illustrating an example of a sequence indicating processing of installing a print setting extension application according to the present exemplary embodiment.

FIG. 5 is a diagram illustrating an example of configuration information stored by a cloud-print-compatible printer according to the present exemplary embodiment.

FIG. 6A is a diagram illustrating an example of device configuration information bundled with an operating system (OS) according to the present exemplary embodiment.

FIGS. 6B-1 and 6B-2 are a diagram illustrating an example of device configuration information extended using information acquired from a cloud print service according to the present exemplary embodiment.

FIG. 7 is a diagram illustrating an example of an extension setup information file to be acquired from an online support service according to the present exemplary embodiment.

FIGS. 8A and 8B are a diagram illustrating an example of a sequence indicating processing of making a print setting on a print setting extension application and transmitting print data according to the present exemplary embodiment.

FIGS. 9A, 9B, 9C, and 9D are diagrams each illustrating an example of a print setting screen to be displayed in a case where a print setting extension application is not installed according to the present exemplary embodiment.

FIGS. 10A, 10B, 10C, 10D, and 10E are diagrams each illustrating an example of a print setting screen to be displayed in a case where a print setting extension application is installed according to the present exemplary embodiment.

FIG. 13 is a flowchart illustrating processing to be performed when a print setting is made on a print setting extension application and print data is generated according to the present exemplary embodiment.

DESCRIPTION OF THE EMBODIMENTS

Hereinafter, exemplary embodiments of the present disclosure will be described with reference to the drawings.

Figure 1:
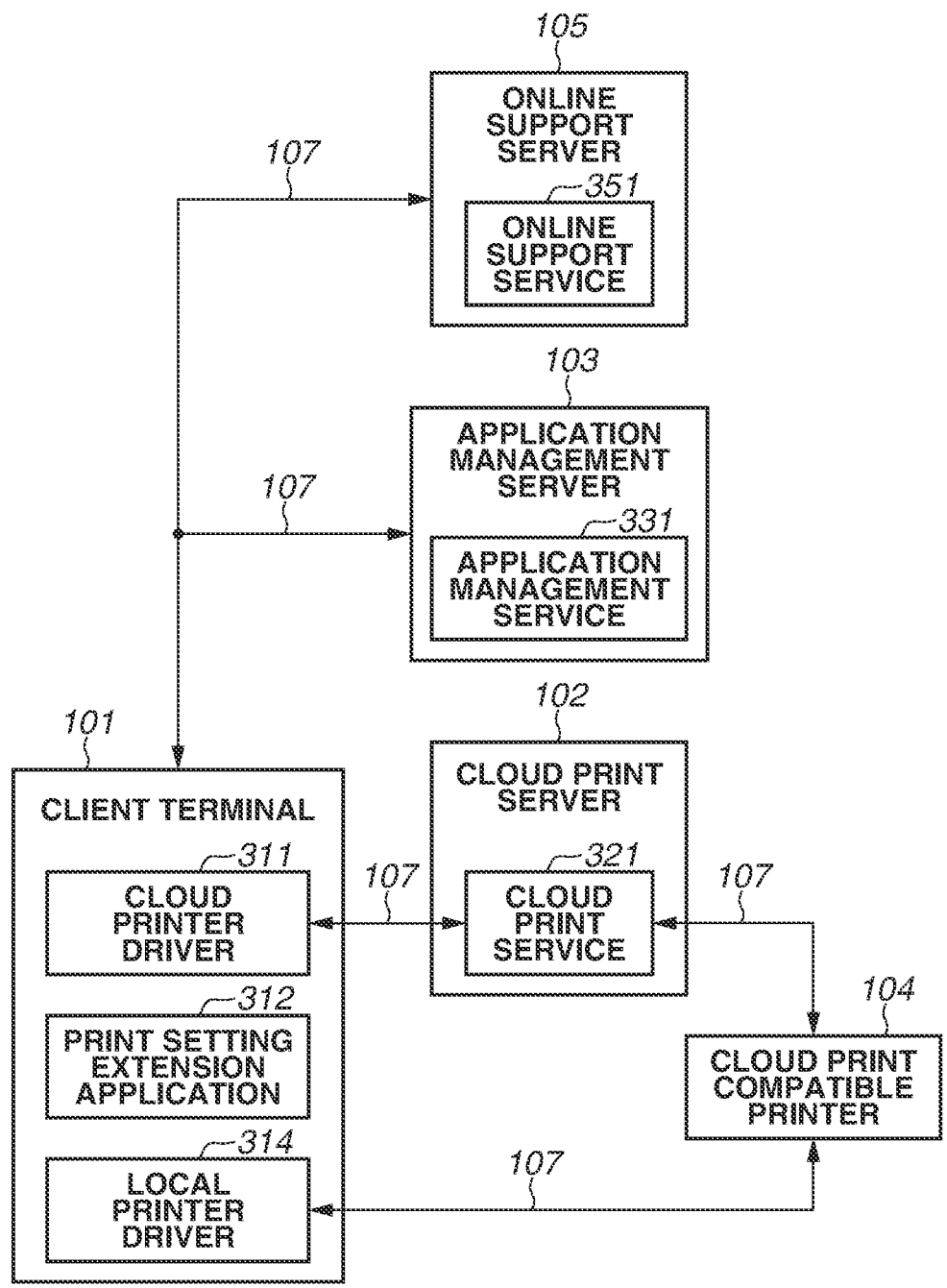
FIG. 1 is a diagram illustrating an example of a printing system according to an exemplary embodiment.

FIG. 1 is a configuration diagram of a printing system in cloud print according to the present exemplary embodiment. A client terminal 101, a cloud print server 102, an application management server 103, a cloud-print-compatible printer 104, and an online support server 105 are connected via a network 107.

FIG. 1 illustrates one client terminal 101 and one cloud-print-compatible printer 104, but a plurality of client terminals 101 and a plurality of cloud-print-compatible printers 104 may be provided.

The cloud print server 102, the application management server 103, and the online support server 105 may be server systems each including a plurality of information processing apparatuses. Since each of the servers is a server system including a plurality of information processing apparatuses, a load can be distributed among the plurality of information processing apparatuses.

Physically, the cloud print server 102, the application management server 103, and the online support server 105 may be virtually formed inside one information processing apparatus.

In the network 107, while it is assumed that a connection to a cloud service is made using a wide area network (WAN) such as the Internet, all connections may be made in a closed environment such as an intracompany local area network (LAN).

The client terminal 101 is an information processing apparatus such as a personal computer (PC), a tablet, or a smartphone, and is a terminal to be directly operated by the user. Application software is executable on the client terminal 101.

The cloud-print-compatible printer 104 is a device that actually performs printing on a recording medium such as a sheet, and is an image forming apparatus that executes printing after converting print data received via the network 107 into image data.

The cloud-print-compatible printer 104 can receive print data from the client terminal 101 via the cloud print server 102, and can directly receive print data from the client terminal 101 not via the cloud print server 102.

The cloud-print-compatible printer 104 receives print data generated by a cloud printer driver 311 of the client terminal 101 via the cloud print server 102. The cloud-print-compatible printer 104 also receives print data generated by a local printer driver 314 of the client terminal 101 not via the cloud print server 102.

The cloud print server 102 receives a printing instruction and print data from the outside. Then, the cloud print server 102 transmits the received print data to a predetermined cloud-print-compatible printer 104.

The application management server 103 stores and manages various applications.

The application management server 103 receives identification information of an application and a download request from the client terminal 101, and transmits the application identified based on the received identification information to the client terminal 101.

The online support server 105 is a server apparatus that provides an online support service 351. The online support service 351 is a service for providing the client terminal 101 with an extension setup information file in which information for extending functions of the client terminal 101 is described.

Next, a hardware configuration of a system according to the present exemplary embodiment will be described with reference to FIGS. 2A to 2E.

Figure 2A:
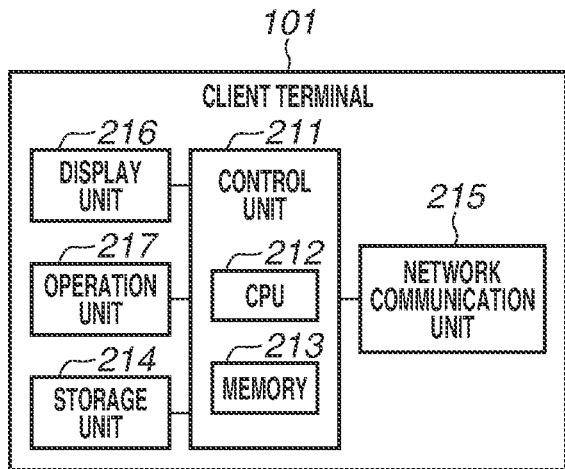
FIGS. 2A, 2B, 2C, 2D, and 2E are diagrams illustrating an example of hardware configurations of an information processing apparatus and an image formation apparatus according to the present exemplary embodiment.

FIG. 2A is a block diagram illustrating a hardware configuration of the client terminal 101.

The client terminal 101 includes a display unit 216, an operation unit 217, a storage unit 214, a control unit 211, and a network communication unit 215.

The storage unit 214 refers to a nonvolatile storage device such as a hard disk or a solid state drive (SSD), and can store and rewrite digital data.

The control unit 211 includes a central processing unit (CPU) 212 and a memory 213, and controls operations of the entire client terminal 101. The CPU 212 loads a program stored in the storage unit 214 into the memory 213, and executes the program. The memory 213 is a main storage memory of the CPU 212 and is used as a work area or a temporary storage area to load various programs.

The network communication unit 215 is a device that communicates with the external network 107, and performs input and output of digital data with an external server or a client terminal via the network 107.

The display unit 216 is a device such as a liquid crystal display for displaying visual information to the user. The operation unit 217 is a device for receiving input from the user via a keyboard or a mouse. A device such as a touch panel that has functions of both the display unit 216 and the operation unit 217 may be used.

Figure 2B:
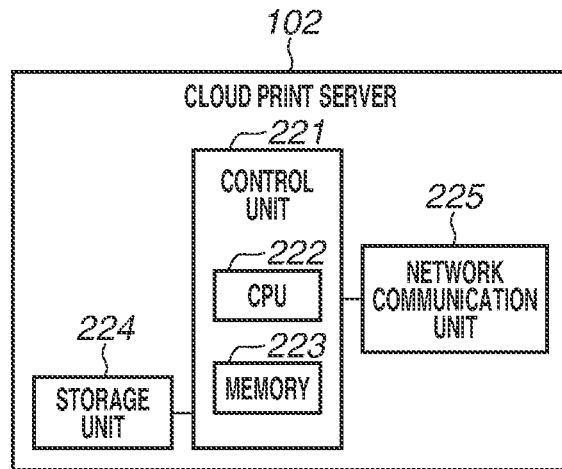

FIG. 2B is a block diagram illustrating a hardware configuration of the cloud print server 102. The cloud print server 102 includes a storage unit 224, a control unit 221, and a network communication unit 225.

Because the storage unit 224, the control unit 221, and the network communication unit 225 are equivalent to those of the client terminal 101, the description thereof will be omitted.

While the description will be given on an assumption that the cloud print server 102 includes one information processing apparatus having the hardware configuration illustrated in FIG. 2B, the cloud print server 102 may include a plurality of information processing apparatuses each having the hardware configuration illustrated in FIG. 2B.

Figure 2C:
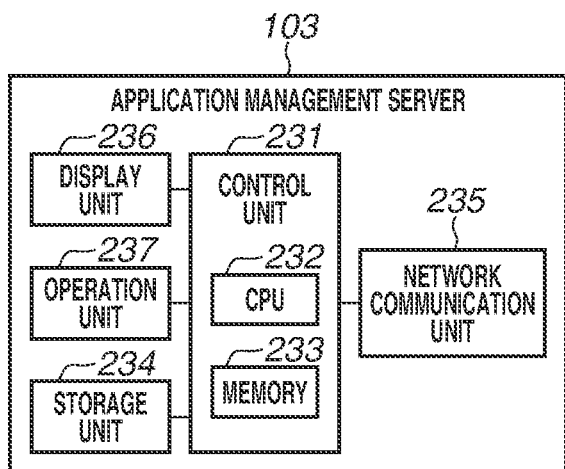

FIG. 2C is a block diagram illustrating a hardware configuration of the application management server 103. The application management server 103 includes a display unit 236, an operation unit 237, a storage unit 234, a control unit 231, and a network communication unit 235.

Because the display unit 236, the operation unit 237, the storage unit 234, the control unit 231, and the network communication unit 235 are equivalent to those of the client terminal 101, the description thereof will be omitted.

While the description will be given on an assumption that the application management server 103 includes one information processing apparatus having the hardware configuration illustrated in FIG. 2C, the application management server 103 may include a plurality of information processing apparatuses.

Figure 2D:
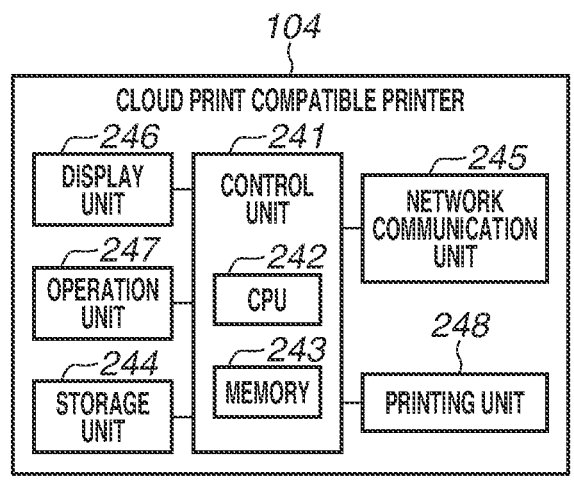

FIG. 2D is a block diagram illustrating a hardware configuration of the cloud-print-compatible printer 104. The cloud-print-compatible printer 104 includes a display unit 246, an operation unit 247, a storage unit 244, a control unit 241, a network communication unit 245, and a printing unit 248.

The display unit 246 is a device such as a touch panel or a light-emitting diode (LED) that is attached to the cloud-print-compatible printer 104 to display information to the user.

The operation unit 247 is a device for receiving input from the user, and may include hardware keys such as a numerical keypad in addition to a touch panel. Because the storage unit 244 and the control unit 241 are equivalent to those of the client terminal 101, the description thereof will be omitted.

The network communication unit 245 is a device that communicates with the external network 107, and mainly has roles of receiving print data and transmitting a state of the cloud-print-compatible printer 104 such as an error to an external server.

The printing unit 248 is a device that performs print processing on sheets prepared in a cassette or a tray, by performing a series of operations including sheet feed, print, and sheet discharge. A printing method is not specifically limited and may be an electrophotographic method or an inkjet method. A two-sided conveyance unit and a finishing device that are to be used in sheet discharge are also included in the printing unit 248. The finishing device performs stapling and punching processing.

In the present exemplary embodiment, a single-function printer including only a print function is described as an example of the cloud-print-compatible printer 104, but a multifunction printer (multifunction peripheral) including a scanner function and a fax function may be used.

Figure 2E:
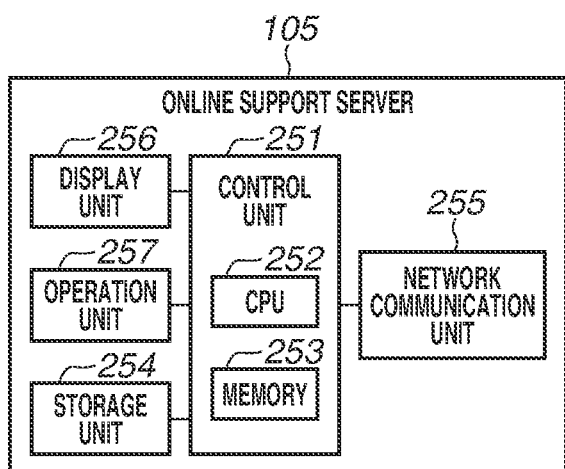

FIG. 2E is a hardware block diagram illustrating details of the online support server 105. In the present exemplary embodiment, while the description will be given on an assumption that the online support server 105 includes one information processing apparatus, the online support server 105 may include a plurality of information processing apparatuses. The online support server 105 includes a display unit 256, an operation unit 257, a storage unit 254, a control unit 251, and a network communication unit 255. Because the display unit 256 and the operation unit 257 are similar to the display unit 216 and the operation unit 217 of the client terminal 101, the description thereof will be omitted. The storage unit 254 is a memory device such as a hard disk drive (HDD) or an SSD. The storage unit 254 stores the extension setup information file that is a file in which information for extending functions provided by the client terminal 101 is described.

The control unit 251 includes a CPU 252 and a memory 253. The CPU 252 controls operations of the entire online support server 105. The memory 253 is used for processing to be executed by the CPU 252. The network communication unit 255 is an interface for the online support server 105 to communicate with the client terminal 101. Via the network communication unit 255, the online support server 105 receives an acquisition request for a file stored in the storage unit 254, and transmits the corresponding file to the client terminal 101.

Next, an example of a procedure to be taken by a user and a sequence of processing to be performed between each software component and a print service according to the present exemplary embodiment will be described with reference to FIGS. 3A and 3B.

First, the cloud-print-compatible printer 104 receives, from the user, a printer registration operation to register the cloud-print-compatible printer 104 in a cloud print service 321. In step S3001, the cloud-print-compatible printer 104 transmits a printer registration request to the cloud print service 321 together with device identification information of a printer. The device identification information transmitted to the cloud print service 321 in this step is a hardware identification (HWID) allocated to each model of a printer, for example. The device identification information may be any information as long as a model of a printer can be identified from the information.

If the cloud print service 321 receives the printer registration request, the cloud print service 321 transmits a uniform resource locator (URL) of the cloud print service 321 for printer registration to the cloud-print-compatible printer 104. If the user accesses the URL from the cloud-print-compatible printer 104 or an information processing apparatus, an input screen to input a user ID and a password is displayed on a display unit of the terminal from which the user has accessed the URL. The user inputs a user ID and a password for using the cloud print service 321, and logs in to the cloud print service 321. If a login of the user succeeds, the cloud print service 321 transmits an acquisition request for information necessary for printer registration to the cloud-print-compatible printer 104. In response to the request, the cloud-print-compatible printer 104 transmits printer information to the cloud print service 321.

Next, the cloud print service 321 that has received the printer registration request registers information regarding the cloud-print-compatible printer 104, and generates a print queue for the cloud-print-compatible printer 104. At this time, the cloud print service 321 acquires capability information of the cloud-print-compatible printer 104, and associates the capability information with the generated print queue. The capability information is information indicating functions included in a printer, and refers to information necessary for the user to make print settings such as duplex capability information, color printing capability information, and stapling capability information at the time of printing.

FIG. 5 is a diagram illustrating examples of the capability information. The capability information includes an item name and an attribute value. The item name corresponds to a setting item of a print setting. The attribute value corresponds to a setting value, an option, and a range of values settable for the setting item. The cloud-print-compatible printer 104 stores item names and attribute values that are uniquely defined by a printer vendor in addition to item names and attribute values that are defined by the Internet Printing Protocol (IPP) as an industry standard specification. For example, among item names and attribute values illustrated in FIG. 5, "store job in printer", "job name abbreviation", and "stapleless binding" and attribute values accompanying these item names are the item names and the attribute values that are uniquely defined by a printer vendor. The item name "store job in printer" is a setting item for setting whether to store print data received by a printer from the cloud print service 321 in the printer even after printing ends. The item name "job name abbreviation" is a setting item for setting whether to display a name allocated to the print data in an abbreviated manner when bibliographic information of the print data received by a printer from the cloud print service 321 is displayed on a display unit of the printer. The item name "stapleless binding" is a setting item for setting whether to bind output sheets that are output based on the print data received by a printer from the cloud print service 321 without using staples. Binding sheets without using staples refers to binding sheets by pressure bonding. An attribute value unique to a printer vendor may be defined as an attribute value corresponding to an item name defined as the industry standard specification. For example, "folding setting" is an item name defined by the IPP. On the other hand, "saddle stitch fold" that is one of attribute values of the "folding setting" is a function of discharging one or more sheets after the sheets are folded together without being bound using staples, and is an attribute value uniquely defined by a printer vendor.

In the present exemplary embodiment, the capability information is transmitted to the cloud print service 321 in compliance with the IPP as a communication protocol. The cloud-print-compatible printer 104 registers the capability information using a command prepared to cause the cloud-print-compatible printer 104 to register the capability information in the cloud print service 321. The cloud-print-compatible printer 104 notifies the cloud print service 321 of the item names illustrated in FIG. 5, and attribute values and default values that correspond to the respective item names. The capability information included in the notification does not depend on whether each item and each attribute value are defined by the IPP. For example, as for "store job in printer", "job name abbreviation", and "stapleless binding" illustrated in FIG. 5, the cloud print service 321 is notified of the item names and the attribute values. In addition, "saddle stitch fold", which is one of the attribute values of "folding setting" and an attribute value unique to a printer vendor, is also registered in the cloud print service 321 as one of the attribute values of the "folding setting".

Next, installation of a print setting extension application 312 that is performed in a case where the user performs a setup operation for executing printing on the cloud-print-compatible printer 104 on the client terminal 101 will be described. When the cloud-print-compatible printer 104 is registered in the client terminal 101, a standard print function that is one of functions included in an operating system (OS) 313 of the client terminal 101 is used.

Figure 4:
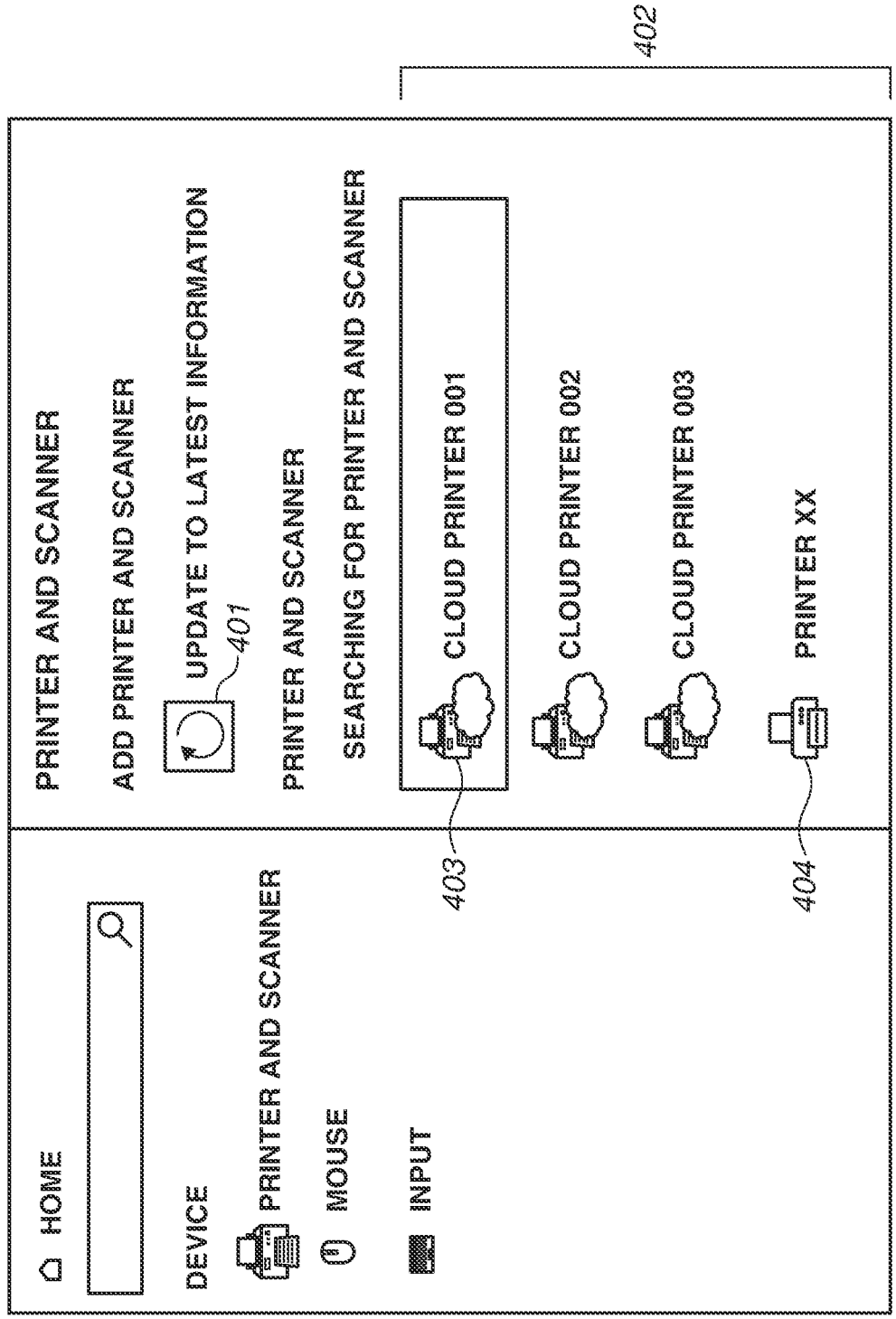
FIG. 4 is a diagram illustrating an example of a screen to be displayed on a client terminal according to the present exemplary embodiment.

In step S3002, the OS 313 of the client terminal 101 receives a printer addition operation performed by the user, which is a setup operation of the cloud-print-compatible printer 104. For example, the setup operation of the cloud-print-compatible printer 104 is the following operation. FIG. 4 illustrates a screen displayed by the OS 313 of the client terminal 101 and providing information regarding printers registered in the client terminal 101. If the user selects an object 401, a printer search instruction is input to the OS 313.

The OS 313 that has received the printer search instruction determines whether the OS 313 holds an access token corresponding to the cloud print service 321. In a case where the OS 313 does not hold the access token, the OS 313 displays a screen (not illustrated) to input user information (login name and password). In step S3003, the OS 313 of the client terminal 101 requests user authentication and the access token by transmitting the user information input via the screen to the cloud print service 321.

In step S3004, the cloud print service 321 performs authentication processing using the user information received from the client terminal 101. If the authentication processing is completed, the cloud print service 321 notifies the client terminal 101 of a result of the authentication processing.

If the user authentication is successful, in step S3005, the OS 313 of the client terminal 101 acquires the access token from the cloud print service 321.

In a case where the user authentication has failed in step S304, in step S3006, the cloud print service 321 notifies the OS 313 of the client terminal 101 of an authentication error. In step S3007, the OS 313 of the client terminal 101 stops the processing based on received information regarding the authentication error. In a case where the access token is not acquired, the OS 313 of the client terminal 101 ends the processing illustrated in FIGS. 3A and 3B.

In a case where the OS 313 holds the access token, or in a case where the OS 313 has acquired the access token in step S3005, the OS 313 of the client terminal 101 advances the processing to step S3008. The OS 313 searches for printers registered in the cloud print service 321 and printers connected to the network 107.

In step S3008, the OS 313 of the client terminal 101 performs a printer search by transmitting an acquisition request for information regarding the printers registered in the cloud print service 321. In step S3008, the OS 313 of the client terminal 101 transmits an acquisition request for printer information that is attached with an access token to the cloud print service 321.

In step S3009, the cloud print service 321 transmits, to the client terminal 101, information regarding a printer that the user is permitted to use and is identified by the access token attached to the acquisition request. The printer information transmitted to the client terminal 101 in step S3009 includes a printer name allocated to a printer registered in the cloud print service 321, and a HWID of the printer.

The OS 313 of the client terminal 101 acquires a list of printers transmitted by the cloud print service 321, and device identification information of each of the printers. Concurrently with the processing in steps S3008 and S3009, the OS 313 of the client terminal 101 searches for printers connected to the same network as the client terminal 101. The printer search is a device search that uses the multicast Domain Name System (mDNS) or Bonjour.

The OS 313 displays the printer list on the client terminal 101 based on printer information acquired from the cloud print service 321 and printer information detected in the search over the network 107. In a region 402 illustrated in FIG. 4, printer information received from the cloud print service 321 is displayed in a list. Among pieces of printer information displayed in the region 402, "Cloud Printer 001/002/003" is information regarding printers registered in the cloud print service 321. On the other hand, "Printer XX" is information regarding a printer detected by the client terminal 101 in the search over the network 107. In this manner, the printer information acquired from the cloud print service 321 and the printer information detected in the search over the network 107 are displayed in a list. An icon 403 is added to the printer information received from the cloud print service 321, and displayed together with the printer information. On the other hand, an icon 404 is added to the printer information detected in the search over the network 107, and displayed together with the printer information. With this configuration, the printer information received from the cloud print service 321 and the printer information detected in the search over the network 107 can be displayed in a distinguishable manner. The client terminal 101 may display only the information regarding the printers registered in the cloud print service 321.

Next, the user selects printer information corresponding to a printer that the user desires to register in the client terminal 101 from the printer information displayed in the region 402.

In step S3010, the OS 313 of the client terminal 101 inquires of the cloud print service 321 about capability information of a printer corresponding to the selected printer information. With regard to which setting item the OS 313 of the client terminal 101 makes an inquiry about the capability information is determined by the specification of the OS 313 and is set in the OS 313. The OS 313 of the client terminal 101 inquires about the capability information by designating a prestored setting item. An item preset in the OS 313 is a setting item defined by the IPP as a standard specification. Examples of the item include "sheet size", "sheet type", and "color mode".

In step S3011, the cloud print service 321 transmits capability information of the cloud-print-compatible printer 104 to the OS 313 of the client terminal 101 as a response.

In the present exemplary embodiment, it is described that information registered in the cloud print service 321 in response to the printer registration request transmitted in step S3001 is transmitted to the client terminal 101 in step S3011. Nevertheless, the capability information registered in the cloud print service 321 at a timing other than the above-described timing may be transmitted to the client terminal 101. For example, when there is a change in capability information of the cloud-print-compatible printer 104, the capability information registered in the cloud print service 321 may be transmitted to the client terminal 101. Alternatively, the user may issue an update instruction of the capability information on a user interface provided by the cloud print service 321, and the capability information updated in response to the update instruction may be transmitted to the client terminal 101. Alternatively, the cloud print service 321 may acquire the capability information from the cloud-print-compatible printer 104 at the timing of step S3010, and notify the client terminal 101 of the acquired capability information.

In step S3011, the cloud print service 321 transmits, as a response, attribute values and default values with regard to a setting item designated by the client terminal 101. In this step, all of the attribute values registered in the cloud print service 321 are transmitted as a response irrespective of whether the attribute values are attribute values defined as standards. The default values are values initially set when the client terminal 101 displays a print setting screen. In a case where the cloud print service 321 does not store a response for an attribute value in the inquiry made by the OS 313 of the client terminal 101, the cloud print service 321 does not transmit a response to the OS 313.

Next, the OS 313 starts the installation of the cloud printer driver 311 based on device identification information and a printer name of a printer selected by the user.

Then, in step S3012, the OS 313 generates a print queue of the cloud printer driver 311 that has basic device capability information bundled with the OS 313. The device capability information refers to definition information necessary for generating print setting capability information of a printer driver, and refers to definition information described in an Extensible Markup Language (XML), such as PrintDeviceCapabilites. FIG. 6A is a diagram illustrating an example of the device capability information in an initial state of being bundled with the OS 313. For example, "Feature" indicates that "PageMediaSize" indicating a sheet size is a setting item. "Option" indicates an option corresponding to "PageMediaSize". As illustrated in FIG. 6A, only two options corresponding to "A4" and "LETTER" are set as default values of sheet size in the device capability information. The information is stored in association with the print queue at the time of generation of the print queue, and managed by the OS 313. The device capability information in the initial state is device capability information fixed irrespective of information regarding a connected printer.

Then, using the capability information acquired from the cloud print service 321, the OS 313 updates the device capability information included in the cloud printer driver 311. FIGS. 6B-1 and 6B-2 are a diagram illustrating an example of the device capability information updated using the capability information acquired from the cloud print service 321. For example, "Option" other than "A4" and "LETTER" is added to "PageMediaSize" indicating a sheet size as a sheet size of sheets printable by the cloud-print-compatible printer 104. In this manner, the client terminal 101 first registers the device capability information bundled with the OS 313 and the cloud printer driver 311 in association in a print queue. Then, the client terminal 101 updates the device capability information associated with the print queue using the capability information acquired from the cloud print service 321. At this time, the OS 313 updates the device capability information using only the attribute values defined by the industry standard specification, among the attribute values in the capability information acquired from the cloud print service 321. Thus, even if an attribute value unique to a vendor is acquired as a sheet type in the acquisition of the capability information, for example, the attribute value unique to the vendor is not added to the device capability information.

With this configuration, a print setting value unsettable in the device capability information bundled with the OS 313 becomes settable.

Through the above processes, the installation of the cloud printer driver 311 is completed. By performing the processing described so far, it becomes possible to transmit print data from the client terminal 101 to the print queue for the cloud-print-compatible printer 104 that has been generated in the cloud print service 321.

Next, the OS 313 starts installation processing of an application that is associated with the printer and that extends a cloud print driver.

First, the OS 313 performs identification additional information allocation processing on the device identification information. The processing is processing required when an extension setup information file 700 is acquired from the online support server 105, and identification additional information may be a character string different from normal device identification information. In the case of the present exemplary embodiment, to distinguish the application from an application for another device, the OS 313 allocates identification additional information ("PrinterApp_") indicating that the application is an application for a printer, to the device identification information. The "PrinterApp_" is an example, and another character string, a number, or a symbol may be added. In a case where the device identification information of the cloud-print-compatible printer 104 indicates "device001", for example, as a result of the above-described processing, the device identification information obtained after the identification additional information allocation processing becomes "PrinterApp_device001".

In step S3013, the OS 313 transmits, to the online support service 351, a search request for the extension setup information file 700 that includes device identification information attached with additional information that is a target. In step S3013, the online support service 351 is notified of "PrinterApp_device001" to which the identification additional information is allocated.

The online support service 351 stores an extension setup information file illustrated in FIG. 7. FIG. 7 illustrates an example of the extension setup information file 700. The extension setup information file is a file that is created by a vendor of the cloud-print-compatible printer 104, and registered in the online support service 351.

In the extension setup information file 700, an application identifier for identifying a print setting extension application to be used for setting of print data to be transmitted to the cloud-print-compatible printer 104 is described. Among items in the extension setup information file 700 illustrated in FIG. 7, an item "PackageFamilyName" corresponds to identification information of the print setting extension application. On the other hand, in "PrinterHardwareID", a character string obtained by adding identification additional information to identification information of the cloud-print-compatible printer 104 is described.

In addition to the extension setup information file in which identification information of a print setting extension application is described, the online support service 351 also stores an extension setup information file in which identification information of a printer driver is described. In the extension setup information file in which the identification information of a printer driver is described, an identifier of the printer driver is described in "PackageFamilyName". In addition, device identification information in which the identification additional information is not written is described in "PrinterHardwareID" of the extension setup information file.

In this manner, the online support service 351 stores both the extension setup information file in which the identifier of the printer driver is described and the extension setup information file in which the identification information of a print setting extension application is described. Thus, in order for the OS 313 to appropriately acquire a necessary extension setup information file, the identification additional information is allocated to the device identification information.

The online support service 351 that has received a search request identifies an extension setup information file including "PackageFamilyName" that matches device identification information attached with identification additional information designated in the search request.

In a case where a search result indicates that the online support service 351 stores the extension setup information file 700 including device identification information that is the target, in step S3014, the online support service 351 returns the extension setup information file 700 to the OS 313. At this time, the content of the extension setup information file is written into a registry of the OS 313.

Next, in step S3015, the OS 313 installs extension setup information written in the extension setup information file acquired from the online support service 351, in association with the print queue generated in step S3012.

Next, in step S3016, the OS 313 extracts an application ID from the installed extension setup information. The application ID is an identifier defined by "PackageFamilyName" in the extension setup information file. The processing described so far is processing performed in a case where the online support service 351 stores the extension setup information file corresponding to the cloud-print-compatible printer 104.

In some cases, the extension setup information file 700 including device identification information that is the target is not detected from the online support service 351 as a result of the search. In such cases, in step S3017, the OS 313 completes the installation of the cloud print driver, and stops application install processing. In a case where an extension setup information file is not received within a predetermined time from the search request in step S3013, or in a case where an error notification is received from the online support service 351, the OS 313 executes the processing described in step S3017.

In step S3018 and subsequent steps, processing to be performed in a case where the extension setup information file is acquired and the application ID is extracted in step S3016 will be described.

In step S3018, the OS 313 transmits, to an application management service 331, a search request for an application with an application ID that matches the extracted application ID. The application management service 331 stores an application operating on the client terminal 101 and an application ID that is an identifier of the application in association with each other. The application and the application ID are registered in the application management service 331 by a vendor that provides the cloud-print-compatible printer 104.

In a case where the application management service 331 holds the print setting extension application with the application ID that matches the requested application ID, in step S3019, the application management service 331 returns the print setting extension application 312 to the client terminal 101. The print setting extension application 312 returned in step S3019 is an application to which the same application ID as the transmitted application ID is allocated.

In step S3020, the OS 313 installs the acquired print setting extension application 312 in association with a print queue on a client side. The OS 313 stores the application ID into a registry as information regarding the print queue. In addition, the print setting extension application 312 sets the OS 313 in such a manner as to issue an event notification at a timing at which the print queue associated with the application is set in the OS 313 on a print setting screen. The installed print setting extension application 312 is activated after power of the client terminal 101 is turned on and the OS 313 is activated, and after the print setting extension application 312 is activated, the print setting extension application 312 operates as a background task.

In a case where the application management service 331 does not hold the print setting extension application with the application ID that matches the requested application ID, in step S3021, the OS 313 stops the application install processing. In this case, the generated print queue and the cloud printer driver 311 are installed in association with each other, and the processing ends without the print setting extension application 312 being associated with the print queue.

In the above description, the search for the extension setup information file is performed by use of the device identification information of the cloud-print-compatible printer 104 to which a predetermined character string is added. In a case where a file for installation of a printer driver is distinguishable, the search may be performed by use of the device identification information to which the predetermined character string is not added.

Next, an example of a procedure to be taken by a user and a sequence of processing to be performed between each software component and a print service according to the present exemplary embodiment will be described with reference to FIGS. 8A and 8B.

A document generation application 315 is an application such as a document data creation application, a presentation material creation application, or a display application of photos or image data.

The document generation application 315 displays, as a print setting initial screen, a print setting screen (FIG. 11) for selecting a print queue. In the present exemplary embodiment, the document generation application 315 displays the print setting initial screen, but the OS 313 may display a similar screen. An object 1101 for selecting a print queue, an object 1102 for making various print settings, and a print preview image 1103 are displayed on the print setting initial screen.

In step S801, the OS 313 selects a print queue associated with a printer set as a default printer. In the present exemplary embodiment, a case is described where the cloud-print-compatible printer 104 is selected as a default printer. The processing in step S801 and subsequent steps is executed also in a case where the user changes a printer to use by operating the object 1101.

Next, in step S802, the OS 313 makes an inquiry about capability information of the cloud-print-compatible printer 104 to a print queue on a cloud corresponding to the cloud-print-compatible printer 104 of the cloud print service 321. With regard to which setting item the OS 313 makes an inquiry about the capability information is predetermined by the specification of the OS 313. Thus, the capability information acquired at this timing is similar to the capability information acquired in step S3010 of FIGS. 3A and 3B. The inquiry is made to the cloud-print-compatible printer 104 by use of a command of a standard protocol defined by the IPP, such as Get-printer-Attributes. In a case where the Get-printer-Attributes is used, an inquiry is made about the capability information determined by the OS 313, in a list form.

In step S803, the cloud print service 321 transmits, as a response, capability information of the cloud-print-compatible printer 104 to the OS 313 from a list of capability information transmitted as a result of the inquiry by use of the Get-printer-Attributes. For example, it is assumed that an attribute of a media size is designated by the Get-printer-Attributes (IPP). In a case where the cloud print service 321 holds the attribute of the media size, the cloud print service 321 returns a value (A4, B5, Letter, etc.) associated with the attribute. In a case where the attribute designated by the Get-printer-Attributes does not exist in the print queue of the cloud-print-compatible printer 104 of the cloud print service 321, the cloud print service 321 does not transmit a response including a value associated with the attribute. The capability information acquired in step S803 is merely capability information to be acquired through the inquiry irrespective of the type or capability of a printer to which the OS 313 is connected.

Using the capability information acquired from the cloud print service 321, the OS 313 updates the device capability information. In step S804, the OS 313 adds the capability information acquired in step S803 of FIG. 8A to the device capability information generated in step S3012 of FIG. 3B. In a case where the device capability information is updated, by performing the processing in step S804, the OS 313 can update the device capability information managed by the client terminal 101. In the update of the device capability information in step S804, the device capability information is updated for only attribute values defined by the industry standard specification.

Next, in step S805, the OS 313 notifies the print setting extension application 312 of an event and an application program interface (API) to be used for editing of the device capability information. A notification timing of the event is registered when the print setting extension application 312 is installed onto the OS 313 of the client terminal 101.

If the print setting extension application 312 receives the event, the print setting extension application 312 issues an acquisition request for the capability information to the cloud print service 321. The acquisition of the capability information performed here is the acquisition of capability information for writing a setting item and an attribute value that are uniquely defined by a printer vendor, into the device capability information.

If the print setting extension application 312 receives the event from the OS 313, in step S806, the print setting extension application 312 inquires about the capability information of the cloud-print-compatible printer 104 via the cloud print service 321. At this time, the print setting extension application 312 inquires of the cloud print service 321 about the capability information for a setting item unique to a printer vendor, or a setting item including an attribute value unique to a printer vendor. Similarly to step S802 of FIG. 8A, an inquiry is made by use of the Get-printer-Attributes, and the capability information is acquired by designation, as the item name, of an item name of a setting item desired to be acquired through the inquiry. In the present exemplary embodiment, the description will be given of a case where the capability information is acquired in step S806 for the setting item uniquely defined by a printer vendor, or the setting item including an attribute value uniquely defined by a printer vendor. The capability information may be acquired for a setting item already acquired in capability information acquisition performed by the OS 313.

If an inquiry about unique capability information is received from the print setting extension application 312, in step S807, the cloud-print-compatible printer 104 responds to the print setting extension application 312 via the cloud print service 321. A response method used in this step is similar to that used in step S3011 of FIG. 3B, which has been described above. In the present exemplary embodiment, in step S807, the cloud print service 321 transmits, as a response, the capability information of the cloud-print-compatible printer 104 that is stored in the cloud print service 321. In response to the request transmitted in step S806, the cloud print service 321 may acquire the capability information from the cloud-print-compatible printer 104 again and transmit the capability information to the client terminal 101 as a response.

If the print setting extension application 312 acquires the capability information from the cloud-print-compatible printer 104, the print setting extension application 312 edits the device capability information managed by the OS 313, via a configuration information object. The configuration information object refers to an aggregate of data sets necessary for editing the device capability information. The print setting extension application 312 cannot directly edit the device capability information included in the OS 313. Thus, the print setting extension application 312 changes the device capability information included in the OS 313 using the configuration information object. In step S808, the print setting extension application 312 edits the device capability information by converting the capability information such as "store job in printer" or "stapleless binding" that has been acquired in step S807 of FIG. 8A into the device capability information, and by adding the device capability information to the configuration information object. When the processing up to step S808 is performed, a setting item and an attribute value that are unique to a printer vendor are stored in the device capability information in addition to the capability information regarding a standard setting item that has been acquired through an inquiry made by the OS 313.

Next, in step S809, the print setting extension application 312 transmits the edited device capability information to the OS 313. The OS 313 stores the device capability information acquired from the print setting extension application 312 in association with the print queue.

If the OS 313 updates the device capability information, in step S810, an object serving as a trigger for displaying a user interface (UI) of the print setting extension application 312 is enabled. The object serving as the trigger for displaying the UI of the print setting extension application 312 is an object 1104 in FIG. 11, for example. Until the processing in step S810 is completed, the object 1104 is grayed out, and a print setting screen of the print setting extension application 312 is not displayed even if the user clicks on the object 1104. If the processing in step S810 is completed, grayout of the object 1104 is canceled, and the user is able to select the object 1104. In this manner, an operation on the object 1104 is disabled until the device capability information is updated, and thus control can be performed in such a manner as to prevent the print setting extension application 312 from displaying the print setting screen.

If the user selects the object 1104, in step S811, the print setting extension application 312 is activated, and a print setting screen as illustrated in FIGS. 10A to 10E is displayed. The print setting screen does not depend on the type of the document generation application 315 to be used.

In a case where the print setting extension application 312 is not associated with a selected print queue, a standard print setting screen preliminarily installed on the OS 313 is displayed as illustrated in FIG. 9A. By a press on an advanced setting button 901 on the standard print setting screen, an advanced print screen illustrated in FIG. 9B is displayed, and an advanced print screen for setting a setting item not displayable on the standard print setting screen in FIG. 9A is displayed. The advanced print screen illustrated in FIG. 9B can be scrolled by the user operating a scroll bar, and as illustrated in FIGS. 9C and 9D, a print setting can be made for a plurality of setting items supported by the OS 313. By selecting an OK button 902, the set print setting can be saved, and the advanced print screen can return to the standard print setting screen illustrated in FIG. 9A. In FIG. 9A, an apply button 903 is a button for saving the print setting, and a cancel button 904 is a button for returning to the screen illustrated in FIG. 11 without saving the print setting. If an OK button 905 is selected, the print setting is saved, and the standard print setting screen returns to the screen illustrated in FIG. 11. On the screens illustrated in FIGS. 9A to 9D, print setting items and attribute values that are uniquely defined by a printer vendor cannot be set.

The description will be provided again on the print setting extension application 312. The print setting extension application 312 receives print setting information generated based on print setting capability information generated by the OS 313 from the device capability information, and displays an extended print setting screen illustrated in FIG. 10A. The extended print setting screen can be scrolled by the user operating a scroll bar as illustrated in FIGS. 10A to 10E, and setting values of various print setting items can be set.

For example, an output sheet size of a setting item 1001 in FIG. 10A is the print setting information generated from psk:PageMediaSize in FIG. 6B-2. An output sheet size "A4" that is an option of the output sheet size is generated by the print setting extension application 312 based on information indicating print setting information psk:IOSA4 and is displayed. In this manner, the print setting extension application 312 displays the extended print setting screen by converting the device capability information into a setting value. Since the extended print setting screen is generated from the device capability information including the capability information regarding a setting item unique to a printer vendor, setting items and setting values that are not settable on the screens provided by the OS 313 and illustrated in FIGS. 9A to 9D can be set.

Figure 10E:
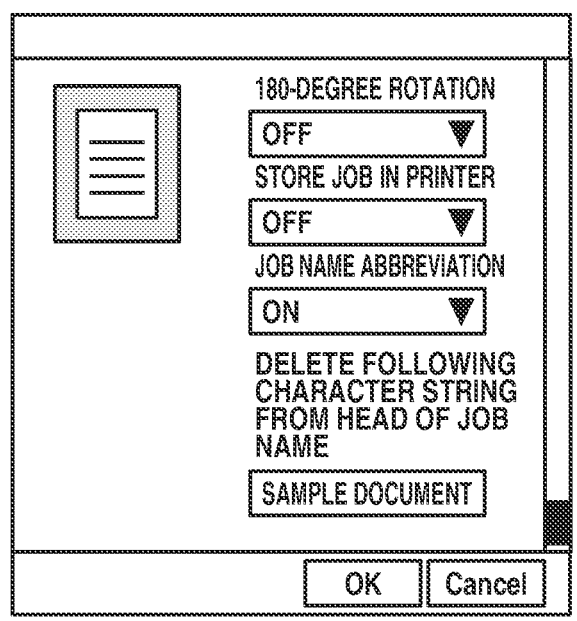
Figure 11:
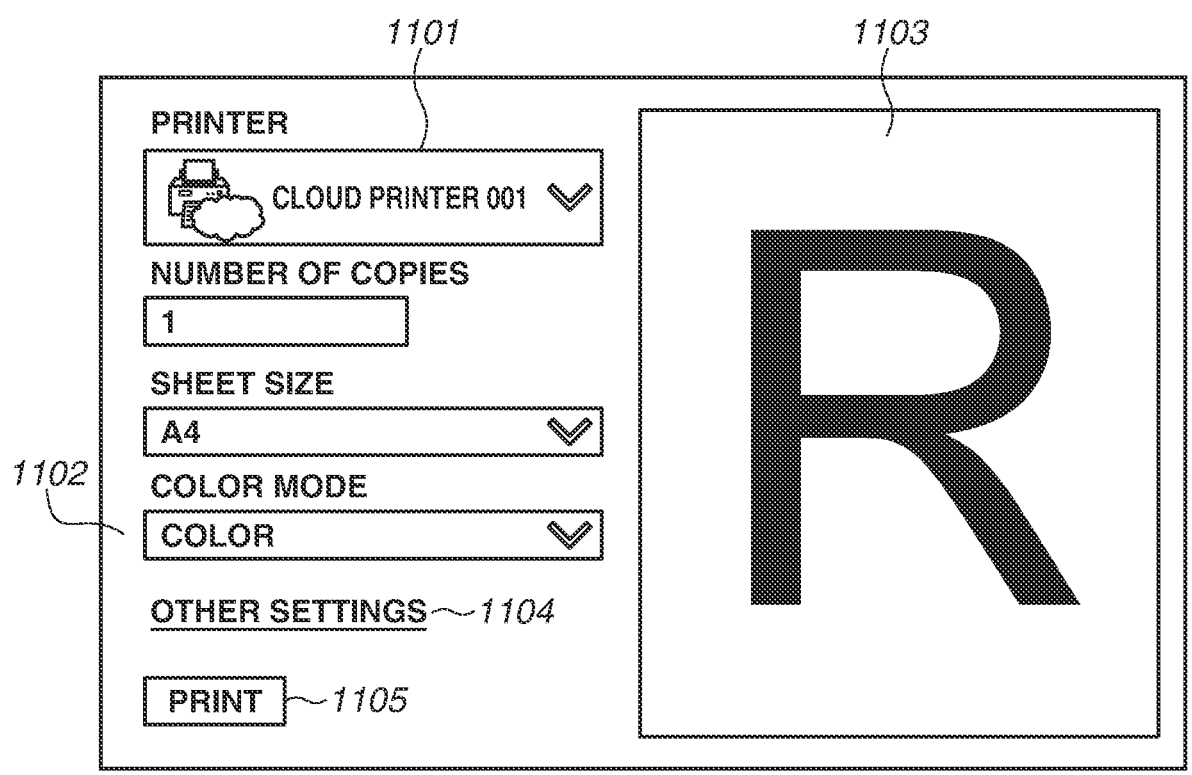
FIG. 11 is a diagram illustrating an example of a print setting screen to be displayed by a document generation application according to the present exemplary embodiment.

The user selects an object 1002 on the extended print setting screen in FIG. 10A that is displayed by the print setting extension application 312. The object 1002 is an object for determining a print setting. The print setting extension application 312 provides a function of freely changing a print setting by the user. In a case where the print setting is changed, a setting value thereof is saved. For example, in a case where the user changes a media size from A4 to Letter on a UI, a media size in print setting information held by the print setting extension application 312 changes from A4 to Letter. If the object 1002 is selected, the print setting extension application 312 acquires the print setting information processed within the control of a print setting screen from the print setting screen, and transmits the print setting information to the OS 313. If the print setting extension application 312 transmits the print setting information to the OS 313, in step S812, the print setting extension application 312 ends display of the print setting screen illustrated in FIGS. 10A to 10E. If the processing in step S812 is completed, the print setting screen illustrated in FIG. 11 is displayed. The print setting screen displayed at this time is a screen on which a setting value set by the print setting extension application 312 is set.

If the user selects an object 1105 on the screen illustrated in FIG. 11, a printing instruction is input to the OS 313. In step S813, the OS 313 executes processing related to printing based on the printing instruction input via the document generation application 315.

If a printing execution instruction is input, in step S814, the OS 313 generates intermediate data and transmits the generated intermediate data and the print setting information edited on the print setting screen to the print setting extension application 312. The intermediate data is data generated before data is converted into print data such as page-description language (PDL) data. For example, XML Paper Specification (XPS) data is the intermediate data. The print setting information is encompassed in the intermediate data.

If the print setting extension application 312 receives the intermediate data and the print setting information from the OS 313, in step S815, the print setting extension application 312 generates print data based on the intermediate data and generates print capability information based on the print setting information. The print data refers to PDL data such as a Portable Document Format (PDF) file. The print capability information specifically refers to information in which the print setting information is described using an attribute value defined by the IPP.

After generating the print data, in step S816, the print setting extension application 312 transmits the generated print data and the print capability information to a print queue of the OS 313.

The processing in steps S814 to S816 is processing to be performed in a case where the print setting extension application 312 associated with a print queue is installed on the client terminal 101. In a case where the print setting extension application 312 is not installed on the client terminal 101, in step S816, the client terminal 101 executes the processing to be described below. In step S817, the OS 313 generates print data and print capability information by generating XPS data, editing a page layout, and converting the XPS data into data in a predetermined format. Examples of the predetermined format include the PDF and Printer Working Group (PWG)-Raster. In step S818, the OS 313 transmits the print data and the print capability information that have been transmitted from the print setting extension application 312, or the print data and the print capability information that have been generated by the OS 313, to the cloud print service 321 via a print queue.

In step S819, the cloud print service 321 transmits the print data and the print capability information that have been transmitted from the client terminal 101 to the cloud-print-compatible printer 104. In the present exemplary embodiment, it has been described that if the cloud print service 321 receives the print data and the print capability information, the cloud print service 321 transmits the received print data and the capability information to the cloud-print-compatible printer 104. However, the cloud-print-compatible printer

104 may regularly make an inquiry to the cloud print service 321, and acquire unprinted print data and print capability information corresponding to the print data.

With the above configuration, it is possible to transmit print data to which a print setting made using the print setting extension application 312 is applied to the cloud-print-compatible printer 104 via the cloud print service 321.

Figure 12:
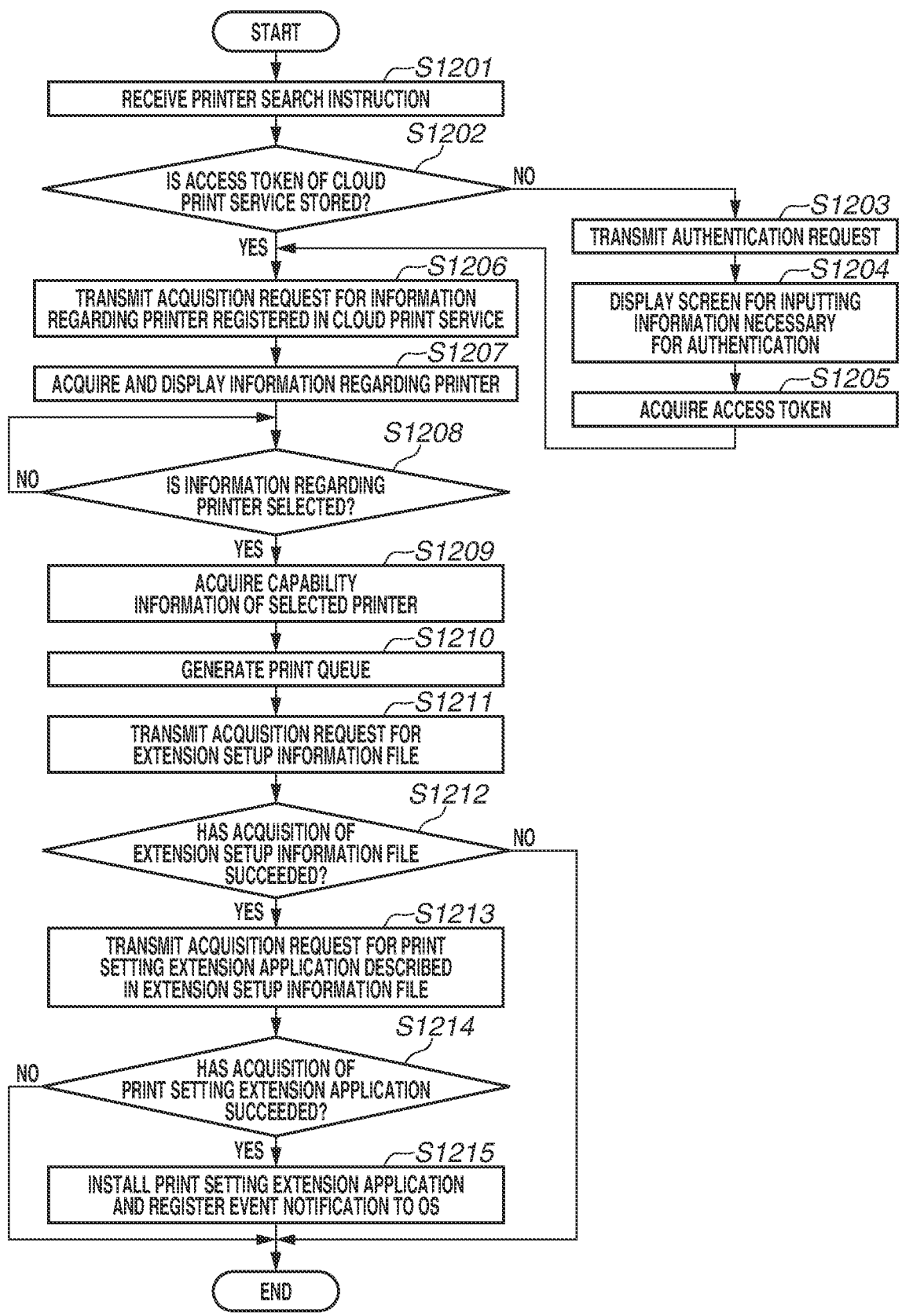
FIG. 12 is a flowchart illustrating processing for installing a print setting extension application onto a client terminal according to the present exemplary embodiment.

FIG. 12 is a flowchart illustrating processing to be performed by the OS 313 to install a print setting extension application onto the client terminal 101. A program for executing the processing illustrated in the flowchart is stored in the storage unit 214 of the client terminal 101. By the CPU 212 executing the program, the processing is implemented.

In step S1201, the CPU 212 displays the screen illustrated in FIG. 4, and receives a printer search instruction. If the user selects the object 401 in FIG. 4, the CPU 212 receives the printer search instruction.

In step S1202, the CPU 212 determines whether an access token of the cloud print service 321 is stored. The client terminal 101 stores an access token for acquiring information from the cloud print service 321 for each user who logs in to the client terminal 101. The CPU 212 determines whether the access token associated with the user who has logged in to the client terminal 101 is stored. In a case where the access token is stored (YES in step S1202), the CPU 212 advances the processing to step S1206, which will be described below.

In a case where the access token is not stored (NO in step S1202), the CPU 212 advances the processing to step S1203. In step S1203, the CPU 212 transmits an authentication request to the cloud print service 321. Then, the CPU 212 receives, from the cloud print service 321, a URL to be used for displaying a screen for inputting information necessary for authentication.

In step S1204, the CPU 212 accesses the received URL, and displays a screen for inputting information to be used for authentication. The information to be used for authentication includes a user ID (user identifier) and a password, for example.

In step S1205, the CPU 212 acquires an access token by transmitting the inputted information to be used for authentication to the cloud print service 321. In a case where the authentication in the cloud print service 321 has failed, the CPU 212 cannot acquire the access token, and ends the processing illustrated in FIG. 12.

In step S1206, using the access token, the CPU 212 transmits an acquisition request for information regarding a printer registered in the cloud print service 321 to the cloud print service 321. The cloud print service 321 selects information regarding a printer available to the user who is identified by the received access token, and transmits the information to the client terminal 101. In this step, a printer name registered in association with the printer available to the user who is identified by the access token received from the client terminal 101, and a HWID of the printer are transmitted to the client terminal 101.

In step S1207, the CPU 212 displays the information regarding the printer that has been acquired from the cloud print service 321 on a display unit of the client terminal 101. By displaying the information regarding the printer in step S1207, the CPU 212 displays the information regarding the printer in the region 402 in FIG. 4 in a list.

In step S1208, the CPU 212 determines whether the information regarding a printer is selected. The CPU 212 repeatedly performs the processing in step S1208 until the information regarding a printer is selected. In a case where the information regarding a printer is selected (YES in step S1208), the CPU 212 executes the processing in step S1209.

In step S1209, the CPU 212 transmits an acquisition request for capability information of the selected printer to the cloud print service 321. In this step, the CPU 212 makes an inquiry to the cloud print service 321 about a setting item registered in the OS 313 in advance.

The CPU 212 generates a print queue by updating printer capability information stored in the client terminal 101 based on the information acquired from the cloud print service 321.

In step S1211, the CPU 212 transmits an acquisition request for an extension setup information file to the online support service 351. The acquisition request includes a HWID of the printer.

In step S1212, the CPU 212 determines whether the acquisition of the extension setup information file has succeeded. In a case where the acquisition of the extension setup information file has succeeded (YES in step S1212), the CPU 212 advances the processing to step S1213. In a case where the acquisition of the extension setup information file has failed (NO in step S1212), the CPU 212 ends the processing illustrated in FIG. 12.

In step S1213, the CPU 212 transmits an acquisition request for a print setting extension application described in the acquired extension setup information file, to the application management service 331. The CPU 212 acquires an application identifier of the print setting extension application from the extension setup information file, and transmits the acquisition request for the print setting extension application to the application management service 331 by designating the acquired application identifier.

In step S1214, the CPU 212 determines whether the acquisition of the print setting extension application has succeeded. In a case where the acquisition of the print setting extension application has failed (NO in step S1214), the CPU 212 ends the processing illustrated in FIG. 12. In a case where the acquisition of the print setting extension application has succeeded (YES in step S1214), the CPU 212 executes the processing in step S1215.

In step S1215, the CPU 212 installs the acquired print setting extension application, and registers the application identifier of the print setting extension application in association with a print queue. Furthermore, the CPU 212 registers an event indicating a notification timing, to the OS 313. In this step, the CPU 212 registers the event in such a manner as to notify the print setting extension application of the event in a case where the print queue associated with the print setting extension application is selected on a print setting screen displayed by a document application.

The processing up to registration of the print setting extension application to the client terminal 101 has been described above.

Next, processing of making a print setting using the installed print setting extension application and generating print data will be described with reference to FIG. 13. A program for executing the processing illustrated in FIG. 13 is stored by the print setting extension application 312. The program is loaded into the memory 213 of the client terminal 101 and executed by the CPU 212.

In step S1301, the CPU 212 determines whether an event notification is received. The event is an event issued by the OS 313 and is an event for notifying the print setting extension application 312 that it is the timing registered in step S1215 of FIG. 12. In a case where the event notification is not received (NO in step S1301), the CPU 212 repeatedly performs the processing in step S1301.

In a case where the event notification is received (YES in step S1301), the CPU 212 executes the processing in step S1302.

In step S1302, the CPU 212 transmits an acquisition request for capability information to the cloud print service 321. The CPU 212 transmits the acquisition request for capability information to the cloud print service 321 with regard to a setting item set in the print setting extension application 312. In this step, the capability information is acquired also with regard to a setting item that is not acquired in step S1206 of FIG. 12.

In step S1303, the CPU 212 determines whether acquisition of capability information is completed. In a case where the acquisition of the capability information is not completed yet (NO in step S1303), the CPU 212 repeatedly performs the processing in step S1303. In a case where the acquisition of the capability information is completed (YES in step S1303), the CPU 212 executes the processing in step S1304.

In step S1304, the CPU 212 updates the device capability information using the acquired capability information. By performing the processing in step S1304, capability information with regard to a setting item not acquired by the OS 313 is also stored in the client terminal 101.

In step S1305, the CPU 212 determines whether an instruction to display a print setting screen by the print setting extension application 312 has been received. The instruction to display a print setting screen by the print setting extension application 312 is an instruction issued based on a user operation such as the selection of the object 1104 in FIG. 11, for example. In a case where the display instruction of the print setting screen is not received (NO in step S1305), the CPU 212 advances the processing to step S1309. In a case where the display instruction of the print setting screen is received (YES in step S1305), the CPU 212 executes the processing in step S1306.

In step S1306, the CPU 212 displays the print setting screen illustrated in FIGS. 10A to 10E based on the device capability information updated in step S1304. Then, the CPU 212 receives, via the displayed print setting screen, a user operation of selecting a setting value.

In step S1307, the CPU 212 determines whether an instruction to end the display of the print setting screen by the print setting extension application 312 is issued. In a case where the instruction to end the display of the print setting screen is not issued (NO in step S1307), the CPU 212 performs the processing in step S1307. In a case where the instruction to end the display of the print setting screen is issued (YES in step S1307), the CPU 212 executes the processing in step S1308.

In step S1308, the CPU 212 edits the print setting information using a setting value selected on the print setting screen displayed by the print setting extension application. Then, the CPU 212 ends the display of the print setting screen by the print setting extension application.

In step S1309, the CPU 212 determines whether the print setting extension application 312 has received intermediate data from the OS 313. In a case where the intermediate data is not received (NO in step S1309), the CPU 212 returns the processing to step S1305. In a case where the intermediate data is received (YES in step S1309), the CPU 212 advances the processing to step S1310.

In step S1310, the CPU 212 generates print data based on the intermediate data received by the print setting extension application 312, and generates print capability information. Based on the intermediate data and print setting information, the CPU 212 generates image data in a predetermined format. Based on the print setting information, the CPU 212 generates print capability information described using an attribute value defined by the IPP. In addition to the attribute value defined by the IPP, free description can also be performed in the print capability information. Thus, a setting item and an attribute value that are uniquely defined by a printer vendor can also be described in the print capability information.

In step S1311, the CPU 212 provides the generated print data to the OS 313. The OS 313 transmits the received print data via a print queue to the cloud print service 321.

The flowchart illustrating processing to be performed when a print setting is made using the print setting extension application 312 and print data and print capability information are generated has been described.

By performing the above-described processing, in a case where print data is transmitted in a state in which a print queue associated with a general-purpose cloud printer driver or a local printer driver is selected, a setting value of a setting item unique to a printer vendor can be set.

Exemplary embodiments of the present disclosure may also be implemented by executing the following processing. More specifically, the processing in which software (program) for executing functions of the above-described exemplary embodiment is supplied to a system or an apparatus via a network or various storage media, and a computer (or CPU, micro processing unit (MPU), or the like) of the system or the apparatus reads out and executes a program code. In this case, the computer program and a storage medium storing the computer program are included in embodiments of the present disclosure.

In a state in which capability information is acquired with regard to a setting item and a setting value that are unique to a vendor, the information processing apparatus described in the present specification can display a print setting screen for setting a setting item and a setting value that are unique to a vendor.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-068063, filed Apr. 18, 2022, which is hereby incorporated by reference herein in its entirety.

What is claimed is:

1. An information processing apparatus storing information regarding a printer and predetermined printing software in association, the information processing apparatus comprising:
    a display unit; and
    a controller configured to:
        cause the display unit to display a first print setting screen provided by a document generation application;
        acquire first capability information defined by Internet Printing Protocol (IPP);
        acquire, by executing a print setting application, second capability information undefined by the IPP;
        store the first capability information and the second capability information having been acquired in association with the information regarding the printer;
        cause the display unit to display a predetermined object in a selectable state after storing the first capability information and the second capability information, the predetermined object having been displayed in a visually-recognizable unselectable state until storing of the first capability information and the second capability information is completed, and the predetermined object being displayed in the first print setting screen; and
        corresponding to a user selection of the displayed predetermined object, cause the display unit to display a second print setting screen for receiving a print setting in accordance with the second capability information stored in association with the information regarding the printer, the second print setting screen being provided by the print setting application.

2. The information processing apparatus according to claim 1, wherein the predetermined object serves as a trigger for displaying the second print setting screen.

3. The information processing apparatus according to claim 1, wherein the second capability information is capability information regarding a function of binding sheets without using a staple.

4. The information processing apparatus according to claim 3, wherein the controller generates print data for which the function of binding sheets without using the staple is enabled.

5. The information processing apparatus according to claim 1, wherein the visually-recognizable unselectable state is a grayed-out state.

6. The information processing apparatus according to claim 1, wherein the predetermined object is displayed together with a print setting object displayed not based on the acquired second capability information but based on the acquired first capability information.

7. The information processing apparatus according to claim 1, wherein the predetermined printing software is a printer driver configured to generate print data to be transmitted to a cloud print service.

8. The information processing apparatus according to claim 7, wherein the first capability information and the second capability information are acquired from the cloud print service.

9. A control method of an information processing apparatus storing information regarding a printer and predetermined printing software in association, the control method comprising:
    causing a display of the information processing apparatus to display a first print setting screen provided by a document generation application;
    acquiring first capability information defined by Internet Printing Protocol (IPP);
    acquiring, by executing a print setting application, second capability information undefined by the IPP;
    storing the acquired first capability information and the acquired second capability information in association with the information regarding the printer;
    causing the display to display a predetermined object in a selectable state after the storing of the first capability information and the second capability information, the predetermined object having been displayed in a visually-recognizable unselectable state until storing of the first capability information and the second capability information is completed, and the predetermined object being displayed in the first print setting screen; and
    corresponding to a user selection of the displayed predetermined object, causing the display to display a second print setting screen for receiving a print setting in accordance with the second capability information stored in association with the information regarding the printer, the second print setting screen being provided by the print setting application.

10. The control method according to claim 9, wherein the predetermined object serves as a trigger for displaying the second print setting screen.

11. The control method according to claim 9, wherein the second capability information is capability information regarding a function of binding sheets without using a staple.

12. The control method according to claim 11, further comprising generating print data for which the function of binding sheets without using the staple is enabled.

13. The control method according to claim 9, wherein the visually-recognizable unselectable state is a grayed-out state.

14. The control method according to claim 9, wherein the predetermined object is displayed together with a print setting object displayed not based on the acquired second capability information but based on the acquired first capability information.

15. The control method according to claim 9, wherein the predetermined printing software is a printer driver configured to generate print data to be transmitted to a cloud print service.

16. The control method according to claim 15,
    wherein the first capability information is acquired from the cloud print service, and
    wherein the second capability information is acquired from the cloud print service.

17. A non-transitory computer-readable storage medium storing a program for causing an information processing apparatus storing information regarding a printer and predetermined printing software in association, to execute a control method of the information processing apparatus, the control method comprising:

causing a display of the information processing apparatus to display a first print setting screen provided by a document generation application;

acquiring first capability information defined by Internet Printing Protocol (IPP);

acquiring, by executing a print setting application, second capability information undefined by the IPP;

storing the acquired first capability information and the acquired second capability information in association with the information regarding the printer;

causing the display to display a predetermined object in a selectable state after the storing of the first capability information and the second capability information, the predetermined object having been displayed in a visually-recognizable unselectable state until storing of the first capability information and the second capability information is completed, and the predetermined object being displayed in the first print setting screen; and corresponding to a user selection of the displayed predetermined object, causing the display to display a second print setting screen for receiving a print setting in accordance with the second capability information stored in association with the information regarding the printer, the second print setting screen being provided by the print setting application.

18. The non-transitory computer-readable storage medium according to claim 17, wherein the predetermined object serves as a trigger for displaying the second print setting screen.

19. The non-transitory computer-readable storage medium according to claim 17, wherein the second capability information is capability information regarding a function of binding sheets without using a staple.

20. The non-transitory computer-readable storage medium according to claim 19, the control method further comprising generating print data for which the function of binding sheets without using the staple is enabled.

21. The non-transitory computer-readable storage medium according to claim 17, wherein the visually-recognizable unselectable state is a grayed-out state.

22. The non-transitory computer-readable storage medium according to claim 17, wherein the predetermined object is displayed together with a print setting object displayed not based on the acquired second capability information but based on the acquired first capability information.

23. The non-transitory computer-readable storage medium according to claim 17, wherein the predetermined printing software is a printer driver configured to generate print data to be transmitted to a cloud print service.

24. The non-transitory computer-readable storage medium according to claim 23,
wherein the first capability information is acquired from the cloud print service, and
wherein the second capability information is acquired from the cloud print service.

* * * * *